US012518278B2

(12) United States Patent
Ebrahimi

(10) Patent No.: US 12,518,278 B2
(45) Date of Patent: *Jan. 6, 2026

(54) SYSTEMS, APPARATUS AND METHODS FOR SECURE ELECTRICAL COMMUNICATION OF BIOMETRIC PERSONAL IDENTIFICATION INFORMATION TO VALIDATE THE IDENTITY OF AN INDIVIDUAL

(71) Applicant: Ping Identity Corporation, Denver, CO (US)

(72) Inventor: Armin Ebrahimi, Los Gatos, CA (US)

(73) Assignee: Ping Identity Corporation, Denver, CO (US)

( * ) Notice: Subject to any disclaimer, the term of this patent is extended or adjusted under 35 U.S.C. 154(b) by 448 days.

This patent is subject to a terminal disclaimer.

(21) Appl. No.: 18/068,083

(22) Filed: Dec. 19, 2022

(65) Prior Publication Data

US 2023/0196362 A1 Jun. 22, 2023

Related U.S. Application Data

(63) Continuation of application No. 17/738,106, filed on May 6, 2022, now Pat. No. 11,544,367, which is a
(Continued)

(51) Int. Cl.
*G06Q 20/40* (2012.01)
*G06F 21/31* (2013.01)
(Continued)

(52) U.S. Cl.
CPC ......... *G06Q 20/4014* (2013.01); *G06F 21/31* (2013.01); *G06F 21/32* (2013.01);
(Continued)

(58) Field of Classification Search
CPC ............... G06Q 20/4014; G06Q 20/02; G06Q 20/3276; G06Q 20/3825; G06Q 20/3827;
(Continued)

(56) References Cited

U.S. PATENT DOCUMENTS 5,005,200 A 4/1991 Fischer
5,901,229 A 5/1999 Fujisaki et al.
(Continued)

FOREIGN PATENT DOCUMENTS

JP 2005260490 A 9/2005
JP 2006179016 A 7/2006
(Continued)

OTHER PUBLICATIONS

OpenID (Recordon et al., "OpneID Authentication 1.1", found at openid.net, May 2006 (Year: 2006).*
(Continued)

*Primary Examiner* — Piotr Poltorak

(57) ABSTRACT

An apparatus for validating an identity of an individual based on biometrics includes a memory and a processor operatively coupled to a distributed database and the memory. The processor is configured to provide biometric data as an input to a predefined hash function to obtain a first biometric hash value. The processor is configured to obtain, using a first pointer to the distributed database, a signed second biometric hash value. The processor is configured to define a certification of the biometric data in response to verifying that a signature of the signed second biometric hash value is associated with the compute device and verifying that the first biometric hash value corresponds with the second biometric hash value. The processor is configured to digitally sign the certification using a private key asso-
(Continued)

ciated with the processor to produce a signed biometric certification and store the signed biometric certification in the distributed database.

20 Claims, 12 Drawing Sheets

Related U.S. Application Data continuation of application No. 17/691,597, filed on Mar. 10, 2022, now abandoned, which is a continuation of application No. 17/514,667, filed on Oct. 29, 2021, now abandoned, which is a continuation of application No. 16/018,773, filed on Jun. 26, 2018, now abandoned, which is a continuation-in-part of application No. 15/146,872, filed on May 4, 2016, now Pat. No. 10,007,913.

(60) Provisional application No. 62/304,934, filed on Mar. 7, 2016, provisional application No. 62/157,256, filed on May 5, 2015.

(51) Int. Cl.
```
    G06F 21/32       (2013.01)
    G06F 21/33       (2013.01)
    G06F 21/34       (2013.01)
    G06F 21/64       (2013.01)
    G06K 19/06       (2006.01)
    G06Q 20/02       (2012.01)
    G06Q 20/32       (2012.01)
    G06Q 20/38       (2012.01)
    H04L 9/06        (2006.01)
    H04L 9/14        (2006.01)
    H04L 9/30        (2006.01)
    H04L 9/32        (2006.01)
    H04L 9/40        (2022.01)
    H04W 12/04       (2021.01)
    H04W 12/06       (2021.01)
    H04L 9/00        (2022.01)
    H04W 12/77       (2021.01)
```

(52) U.S. Cl.
CPC .............. *G06F 21/33* (2013.01); *G06F 21/34* (2013.01); *G06F 21/64* (2013.01); *G06F 21/645* (2013.01); *G06K 19/06028* (2013.01); *G06K 19/06037* (2013.01); *G06Q 20/02* (2013.01); *G06Q 20/3276* (2013.01); *G06Q 20/3825* (2013.01); *G06Q 20/3827* (2013.01); *H04L 9/0637* (2013.01); *H04L 9/0643* (2013.01); *H04L 9/14* (2013.01); *H04L 9/30* (2013.01); *H04L 9/302* (2013.01); *H04L 9/3066* (2013.01); *H04L 9/3231* (2013.01); *H04L 9/3236* (2013.01); *H04L 9/3239* (2013.01); *H04L 9/3247* (2013.01); *H04L 9/3249* (2013.01); *H04L 9/3252* (2013.01); *H04L 9/3268* (2013.01); *H04L 63/0861* (2013.01); *H04W 12/04* (2013.01); *H04W 12/06* (2013.01); *G06Q 2220/00* (2013.01); *H04L 9/50* (2022.05); *H04W 12/77* (2021.01)

(58) Field of Classification Search
CPC .. G06Q 2220/00; G06Q 20/065; G06F 21/31; G06F 21/32; G06F 21/33; G06F 21/34; G06F 21/64; G06F 21/645; G06K 19/06028; G06K 19/06037; H04L 9/0637; H04L 9/0643; H04L 9/14; H04L 9/30; H04L 9/302; H04L 9/3066; H04L 9/3231; H04L 9/3236; H04L 9/3239; H04L 9/3247; H04L 9/3249; H04L 9/3252; H04L 9/3268; H04L 63/0861; H04L 9/50; H04W 12/04; H04W 12/06; H04W 12/77
See application file for complete search history.

(56) References Cited

U.S. PATENT DOCUMENTS

| | | |
|---|---|---|
| 5,923,763 A | 7/1999 | Walker et al. |
| 5,996,076 A | 11/1999 | Rowney et al. |
| 6,088,717 A | 7/2000 | Reed et al. |
| 6,310,966 B1 | 10/2001 | Dulude et al. |
| 6,317,834 B1 | 11/2001 | Gennaro et al. |
| 6,785,815 B1 | 8/2004 | Serret-Avila et al. |
| 6,792,536 B1 | 9/2004 | Teppler |
| 7,043,635 B1 | 5/2006 | Keech |
| 7,162,635 B2 | 1/2007 | Bisbee et al. |
| 7,225,161 B2 | 5/2007 | Lam et al. |
| 7,406,596 B2 | 7/2008 | Tararoukhine et al. |
| 7,451,116 B2 | 11/2008 | Parmelee et al. |
| 7,502,467 B2 | 3/2009 | Brainard et al. |
| 7,606,795 B2 | 10/2009 | Hsu et al. |
| 7,873,573 B2 | 1/2011 | Realini |
| 7,886,345 B2 | 2/2011 | Kaliski et al. |
| 7,949,606 B1 | 5/2011 | Sweet |
| 7,958,367 B2 | 6/2011 | Uesugi et al. |
| 8,056,822 B2 | 11/2011 | Bourrieres et al. |
| 8,078,880 B2 | 12/2011 | Nanda et al. |
| 8,249,965 B2 | 8/2012 | Tumminaro |
| 8,375,425 B2 | 2/2013 | Keohane et al. |
| 8,447,967 B1 | 5/2013 | Janacek et al. |
| 8,502,060 B2 | 8/2013 | Ribner |
| 8,607,358 B1 | 12/2013 | Shankar et al. |
| 8,744,076 B2 | 6/2014 | Youn |
| 8,762,712 B1 | 6/2014 | Kwan et al. |
| 8,832,807 B1 | 9/2014 | Kuo et al. |
| 8,874,915 B1 | 10/2014 | Rodoper et al. |
| 8,966,276 B2 | 2/2015 | Nanopoulos et al. |
| 9,059,858 B1 | 6/2015 | Giardina et al. |
| 9,135,787 B1 | 9/2015 | Russell et al. |
| 9,172,699 B1 | 10/2015 | Vazquez et al. |
| 9,189,788 B1 | 11/2015 | Robinson et al. |
| 9,237,149 B2 | 1/2016 | Schneider |
| 9,240,058 B1 | 1/2016 | Amacker et al. |
| 9,246,686 B1 | 1/2016 | Holland et al. |
| 9,252,951 B1 | 2/2016 | Katzer |
| 9,288,047 B2 | 3/2016 | Brouwer et al. |
| 9,331,856 B1 | 5/2016 | Song |
| 9,397,985 B1 | 7/2016 | Seger, II et al. |
| 9,608,822 B2 | 3/2017 | Lochmatter et al. |
| 9,646,150 B2 | 5/2017 | Toth |
| 9,679,276 B1 | 6/2017 | Cuende |
| 9,722,790 B2 | 8/2017 | Ebrahimi |
| 9,876,646 B2 | 1/2018 | Ebrahimi et al. |
| 9,887,975 B1 | 2/2018 | Gifford et al. |
| 9,917,828 B2 | 3/2018 | Byrum et al. |
| 9,948,467 B2 | 4/2018 | King |
| 10,007,826 B2 | 6/2018 | Ebrahimi et al. |
| 10,007,913 B2 | 6/2018 | Ebrahimi |
| 10,108,954 B2 | 10/2018 | Dunlevy et al. |
| 10,110,385 B1 | 10/2018 | Rush et al. |
| 10,163,105 B1 | 12/2018 | Ziraknejad et al. |
| 10,255,419 B1 | 4/2019 | Kragh |
| 10,257,179 B1 | 4/2019 | Saylor et al. |
| 10,341,091 B2 | 7/2019 | Keranen et al. |
| 10,341,123 B2 | 7/2019 | Ebrahimi et al. |
| 10,417,219 B1 | 9/2019 | Yang et al. |
| 10,498,541 B2 | 12/2019 | Ebrahimi et al. |
| 10,498,542 B2 | 12/2019 | Ebrahimi et al. |
| 10,509,932 B2 | 12/2019 | Ebrahimi et al. |
| 10,547,453 B2 | 1/2020 | Csik et al. |
| 10,554,654 B1 | 2/2020 | Ramanathan et al. |
| 10,587,609 B2 | 3/2020 | Ebrahimi et al. |
| 10,657,532 B2 | 5/2020 | Ebrahimi |
| 10,740,584 B2 | 8/2020 | Ebrahimi et al. |
| 10,805,085 B1 | 10/2020 | Liang |

(56) References Cited

U.S. PATENT DOCUMENTS

| | | |
|---|---|---|
| 10,979,227 B2 | 4/2021 | Ebrahimi |
| 11,025,626 B1 | 6/2021 | Todd et al. |
| 11,030,187 B1 | 6/2021 | Boodman et al. |
| 11,062,106 B2 | 7/2021 | Ebrahimi et al. |
| 11,082,221 B2 | 8/2021 | Ebrahimi et al. |
| 11,134,075 B2 | 9/2021 | Ebrahimi et al. |
| 11,206,133 B2 | 12/2021 | Ebrahimi et al. |
| 11,263,415 B2 | 3/2022 | Ebrahimi et al. |
| 11,323,272 B2 | 5/2022 | Ebrahimi et al. |
| 11,544,367 B2 | 1/2023 | Ebrahimi |
| 11,544,487 B2 | 1/2023 | Ebrahimi et al. |
| 11,658,961 B2 | 5/2023 | Ebrahimi et al. |
| 11,722,301 B2 | 8/2023 | Ebrahimi |
| 11,777,726 B2 | 10/2023 | Ebrahimi et al. |
| 11,799,668 B2 | 10/2023 | Ebrahimi et al. |
| 11,818,265 B2 | 11/2023 | Ebrahimi et al. |
| RE49,968 E | 5/2024 | Ebrahimi et al. |
| 2001/0011350 A1 | 8/2001 | Zabetian |
| 2002/0016913 A1 | 2/2002 | Wheeler et al. |
| 2002/0071565 A1 | 6/2002 | Kurn et al. |
| 2002/0138735 A1 | 9/2002 | Felt et al. |
| 2002/0141593 A1 | 10/2002 | Kurn et al. |
| 2002/0170966 A1 | 11/2002 | Hannigan et al. |
| 2003/0014372 A1 | 1/2003 | Wheeler et al. |
| 2003/0037261 A1 | 2/2003 | Meffert et al. |
| 2003/0046159 A1 | 3/2003 | Ebrahimi et al. |
| 2003/0055792 A1 | 3/2003 | Kinoshita et al. |
| 2003/0070075 A1 | 4/2003 | Deguillaume et al. |
| 2003/0172273 A1 | 9/2003 | Hans |
| 2004/0064693 A1 | 4/2004 | Pabla et al. |
| 2004/0236953 A1 | 11/2004 | Merenne et al. |
| 2005/0039040 A1 | 2/2005 | Ransom et al. |
| 2005/0091495 A1 | 4/2005 | Cameron et al. |
| 2005/0114447 A1 | 5/2005 | Cameron et al. |
| 2006/0041756 A1 | 2/2006 | Ashok et al. |
| 2006/0071077 A1 | 4/2006 | Suomela et al. |
| 2006/0075255 A1 | 4/2006 | Duffy et al. |
| 2006/0256961 A1 | 11/2006 | Brainard et al. |
| 2007/0016785 A1 | 1/2007 | Guay et al. |
| 2007/0017996 A1 | 1/2007 | Xia et al. |
| 2007/0033150 A1 | 2/2007 | Nwosu |
| 2007/0118479 A1 | 5/2007 | Halsema et al. |
| 2007/0206838 A1 | 9/2007 | Fouquet |
| 2007/0277013 A1 | 11/2007 | Rexha et al. |
| 2007/0294538 A1 | 12/2007 | Lim et al. |
| 2008/0078836 A1 | 4/2008 | Tomita |
| 2008/0116277 A1 | 5/2008 | Tomita |
| 2008/0155253 A1 | 6/2008 | Liu |
| 2008/0178008 A1 | 7/2008 | Takahashi et al. |
| 2008/0235772 A1 | 9/2008 | Janzen |
| 2008/0267511 A1 | 10/2008 | Bourrieres et al. |
| 2009/0066478 A1 | 3/2009 | Colella |
| 2009/0132813 A1 | 5/2009 | Schibuk |
| 2009/0232346 A1 | 9/2009 | Zilch |
| 2009/0235332 A1 | 9/2009 | Nuzzi et al. |
| 2009/0266882 A1 | 10/2009 | Sajkowsky |
| 2010/0020970 A1 | 1/2010 | Liu et al. |
| 2010/0023758 A1 | 1/2010 | Han et al. |
| 2010/0024025 A1 | 1/2010 | Yoshida et al. |
| 2010/0052852 A1 | 3/2010 | Mohanty |
| 2010/0070759 A1 | 3/2010 | Leon Cobos et al. |
| 2010/0088517 A1 | 4/2010 | Piersol |
| 2010/0100724 A1 | 4/2010 | Kaliski, Jr. |
| 2010/0191972 A1 | 7/2010 | Kiliccote |
| 2010/0228674 A1 | 9/2010 | Ogg et al. |
| 2010/0250939 A1 | 9/2010 | Adams et al. |
| 2010/0272193 A1 | 10/2010 | Khan et al. |
| 2010/0287288 A1 | 11/2010 | Driscoll et al. |
| 2011/0093249 A1 | 4/2011 | Holmes et al. |
| 2011/0121066 A1 | 5/2011 | Tian et al. |
| 2011/0231913 A1 | 9/2011 | Feng et al. |
| 2011/0286595 A1 | 11/2011 | Resch et al. |
| 2011/0302412 A1 | 12/2011 | Deng et al. |
| 2011/0307703 A1 | 12/2011 | Ogg et al. |
| 2012/0061461 A1 | 3/2012 | Bourrieres et al. |
| 2012/0067943 A1 | 3/2012 | Saunders et al. |
| 2012/0086971 A1 | 4/2012 | Bisbee et al. |
| 2012/0125997 A1 | 5/2012 | Burra et al. |
| 2012/0137131 A1 | 5/2012 | Lu et al. |
| 2012/0185398 A1 | 7/2012 | Weis et al. |
| 2012/0210134 A1 | 8/2012 | Mitter |
| 2012/0211567 A1 | 8/2012 | Herzig |
| 2012/0297190 A1 | 11/2012 | Shen et al. |
| 2012/0297464 A1 | 11/2012 | Busch et al. |
| 2012/0308003 A1 | 12/2012 | Mukherjee |
| 2013/0010958 A1 | 1/2013 | Yao |
| 2013/0014152 A1 | 1/2013 | Johnson et al. |
| 2013/0037607 A1 | 2/2013 | Bullwinkel |
| 2013/0065564 A1 | 3/2013 | Conner et al. |
| 2013/0111208 A1 | 5/2013 | Sabin et al. |
| 2013/0145152 A1 | 6/2013 | Maino et al. |
| 2013/0153666 A1 | 6/2013 | Edwards |
| 2013/0159021 A1 | 6/2013 | Felsher |
| 2013/0173915 A1 | 7/2013 | Haulund |
| 2013/0198822 A1 | 8/2013 | Hitchcock et al. |
| 2013/0228624 A1 | 9/2013 | Byrd et al. |
| 2013/0246261 A1 | 9/2013 | Purves et al. |
| 2013/0262309 A1 | 10/2013 | Gadotti |
| 2013/0262857 A1 | 10/2013 | Neuman et al. |
| 2013/0290733 A1 | 10/2013 | Branton et al. |
| 2013/0305059 A1 | 11/2013 | Gormley et al. |
| 2013/0311768 A1 | 11/2013 | Fosmark et al. |
| 2013/0318354 A1 | 11/2013 | Entschew et al. |
| 2013/0333009 A1 | 12/2013 | Mackler |
| 2013/0339749 A1 | 12/2013 | Spuehier et al. |
| 2014/0001253 A1 | 1/2014 | Smith |
| 2014/0006247 A1 | 1/2014 | Chai et al. |
| 2014/0006806 A1 | 1/2014 | Corella et al. |
| 2014/0007179 A1 | 1/2014 | Moore |
| 2014/0032913 A1 | 1/2014 | Tenenboym et al. |
| 2014/0084067 A1 | 3/2014 | Vanderhulst |
| 2014/0093144 A1 | 4/2014 | Feekes |
| 2014/0188790 A1 | 7/2014 | Hunter |
| 2014/0208403 A1 | 7/2014 | Lu et al. |
| 2014/0223175 A1 | 8/2014 | Bhatnagar |
| 2014/0237565 A1 | 8/2014 | Fleysher |
| 2014/0254796 A1 | 9/2014 | Li et al. |
| 2014/0256423 A1 | 9/2014 | Williams et al. |
| 2014/0282961 A1 | 9/2014 | Dorfman et al. |
| 2014/0289842 A1 | 9/2014 | Cornick et al. |
| 2014/0304517 A1 | 10/2014 | Chidambaram et al. |
| 2014/0344015 A1 | 11/2014 | Puertolas-Montanes et al. |
| 2015/0019456 A1 | 1/2015 | Smith |
| 2015/0047000 A1 | 2/2015 | Spencer, III et al. |
| 2015/0081567 A1 | 3/2015 | Boyle et al. |
| 2015/0095352 A1 | 4/2015 | Lacey |
| 2015/0095999 A1 | 4/2015 | Toth |
| 2015/0104013 A1 | 4/2015 | Holman et al. |
| 2015/0106626 A1 | 4/2015 | Kremp et al. |
| 2015/0178515 A1 | 6/2015 | Cooley et al. |
| 2015/0220917 A1 | 8/2015 | Aabye et al. |
| 2015/0244690 A1 | 8/2015 | Mossbarger |
| 2015/0261996 A1 | 9/2015 | Kim |
| 2015/0262138 A1 | 9/2015 | Hudon |
| 2015/0269389 A1 | 9/2015 | Lee |
| 2015/0269614 A1 | 9/2015 | Kramer |
| 2015/0278805 A1 | 10/2015 | Spencer, III et al. |
| 2015/0278820 A1 | 10/2015 | Meadows |
| 2015/0302401 A1 | 10/2015 | Metral |
| 2015/0332283 A1 | 11/2015 | Witchey |
| 2015/0356523 A1 | 12/2015 | Madden |
| 2015/0356555 A1 | 12/2015 | Pennanen |
| 2015/0365436 A1 | 12/2015 | Shenefiel et al. |
| 2015/0372811 A1 | 12/2015 | Le Saint et al. |
| 2016/0005032 A1 | 1/2016 | Yau et al. |
| 2016/0012465 A1 | 1/2016 | Sharp |
| 2016/0028452 A1 | 1/2016 | Chu et al. |
| 2016/0028552 A1 | 1/2016 | Spanos et al. |
| 2016/0072800 A1 | 3/2016 | Soon-Shiong et al. |
| 2016/0094348 A1 | 3/2016 | Takahashi |
| 2016/0098723 A1 | 4/2016 | Feeney |
| 2016/0098730 A1 | 4/2016 | Feeney |
| 2016/0125416 A1 | 5/2016 | Spencer et al. |
| 2016/0134593 A1 | 5/2016 | Gvili |

(56) References Cited

U.S. PATENT DOCUMENTS

| | | |
|---|---|---|
| 2016/0162897 A1 | 6/2016 | Feeney |
| 2016/0180338 A1 | 6/2016 | Androulaki et al. |
| 2016/0203572 A1 | 7/2016 | Mcconaghy et al. |
| 2016/0212146 A1 | 7/2016 | Wilson |
| 2016/0217356 A1 | 7/2016 | Wesby |
| 2016/0217436 A1 | 7/2016 | Brama |
| 2016/0241389 A1 | 8/2016 | Le Saint et al. |
| 2016/0261411 A1 | 9/2016 | Yau et al. |
| 2016/0269182 A1 | 9/2016 | Sriram et al. |
| 2016/0269403 A1 | 9/2016 | Koutenaei et al. |
| 2016/0283920 A1 | 9/2016 | Fisher et al. |
| 2016/0283939 A1 | 9/2016 | Finlow-Bates |
| 2016/0283941 A1 | 9/2016 | Andrade |
| 2016/0300234 A1 | 10/2016 | Moss-Pultz et al. |
| 2016/0314462 A1 | 10/2016 | Hong et al. |
| 2016/0328713 A1 | 11/2016 | Ebrahimi |
| 2016/0330027 A1 | 11/2016 | Ebrahimi |
| 2016/0330035 A1 | 11/2016 | Ebrahimi et al. |
| 2016/0337351 A1 | 11/2016 | Spencer et al. |
| 2016/0351080 A1 | 12/2016 | Bhatnagar et al. |
| 2016/0373440 A1 | 12/2016 | Mather et al. |
| 2017/0041296 A1 | 2/2017 | Ford et al. |
| 2017/0048252 A1 | 2/2017 | Straub et al. |
| 2017/0063553 A1 | 3/2017 | Saxena et al. |
| 2017/0085377 A1 | 3/2017 | Pogmore et al. |
| 2017/0103389 A1 | 4/2017 | Sorensen et al. |
| 2017/0109735 A1 | 4/2017 | Sheng et al. |
| 2017/0141926 A1 | 5/2017 | Xu et al. |
| 2017/0177855 A1* | 6/2017 | Costa Faidella ...... H04L 63/123 |
| 2017/0180128 A1 | 6/2017 | Lu |
| 2017/0200160 A1 | 7/2017 | Kumar et al. |
| 2017/0228731 A1 | 8/2017 | Sheng et al. |
| 2017/0236121 A1 | 8/2017 | Lyons et al. |
| 2017/0255805 A1 | 9/2017 | Ebrahimi et al. |
| 2017/0257358 A1 | 9/2017 | Ebrahimi et al. |
| 2017/0279788 A1 | 9/2017 | Rosenblum et al. |
| 2017/0324711 A1 | 11/2017 | Feeney et al. |
| 2017/0344987 A1 | 11/2017 | Davis |
| 2017/0344988 A1 | 11/2017 | Cusden et al. |
| 2017/0346851 A1 | 11/2017 | Drake |
| 2017/0357826 A1 | 12/2017 | Gouget et al. |
| 2017/0359723 A1 | 12/2017 | Pal et al. |
| 2017/0372300 A1 | 12/2017 | Dunlevy et al. |
| 2018/0019879 A1 | 1/2018 | Kravitz et al. |
| 2018/0068103 A1 | 3/2018 | Pitkanen et al. |
| 2018/0077144 A1 | 3/2018 | Gangawane et al. |
| 2018/0082050 A1 | 3/2018 | Flink et al. |
| 2018/0082256 A1 | 3/2018 | Tummuru et al. |
| 2018/0083771 A1 | 3/2018 | Bonnell |
| 2018/0144153 A1 | 5/2018 | Pead |
| 2018/0173906 A1 | 6/2018 | Rodriguez et al. |
| 2018/0176017 A1 | 6/2018 | Rodriguez et al. |
| 2018/0191503 A1* | 7/2018 | Alwar ................... H04L 9/3242 |
| 2018/0205556 A1 | 7/2018 | Rieul |
| 2018/0240107 A1 | 8/2018 | Andrade |
| 2018/0248699 A1 | 8/2018 | Andrade |
| 2018/0270071 A1 | 9/2018 | Feraud et al. |
| 2018/0308098 A1 | 10/2018 | Ebrahimi |
| 2018/0343120 A1 | 11/2018 | Andrade |
| 2018/0359103 A1 | 12/2018 | Geupel |
| 2019/0005470 A1 | 1/2019 | Uhr et al. |
| 2019/0007381 A1 | 1/2019 | Isaacson et al. |
| 2019/0149537 A1 | 5/2019 | Ebrahimi et al. |
| 2019/0163896 A1 | 5/2019 | Balaraman et al. |
| 2019/0182042 A1 | 6/2019 | Ebrahimi et al. |
| 2019/0228178 A1 | 7/2019 | Sharma et al. |
| 2019/0342096 A1 | 11/2019 | Starosielsky et al. |
| 2019/0372956 A1 | 12/2019 | Breu |
| 2020/0127826 A1 | 4/2020 | Ebrahimi et al. |
| 2020/0127832 A1 | 4/2020 | Ebrahimi |
| 2020/0145219 A1 | 5/2020 | Sebastian et al. |
| 2020/0186505 A1 | 6/2020 | Amar et al. |
| 2020/0265202 A1 | 8/2020 | Ebrahimi et al. |
| 2020/0267003 A1 | 8/2020 | Ebrahimi et al. |
| 2020/0344062 A1 | 10/2020 | Haldar et al. |
| 2021/0064780 A1 | 3/2021 | Riedel et al. |
| 2021/0192166 A1 | 6/2021 | Ebrahimi et al. |
| 2021/0334808 A1 | 10/2021 | Ebrahimi |
| 2021/0406495 A1 | 12/2021 | Ebrahimi et al. |
| 2022/0029799 A1 | 1/2022 | Subudhi et al. |
| 2022/0029802 A1 | 1/2022 | Ebrahimi et al. |
| 2022/0029807 A1 | 1/2022 | Ebrahimi |
| 2022/0078178 A1 | 3/2022 | Ebrahimi et al. |
| 2022/0255737 A1 | 8/2022 | Ebrahimi et al. |
| 2022/0327304 A1 | 10/2022 | Ebrahimi et al. |
| 2022/0337419 A1 | 10/2022 | Ebrahimi |
| 2022/0342973 A1 | 10/2022 | Ebrahimi |
| 2022/0384027 A1* | 12/2022 | Kaleal, III ............... A61B 5/11 |
| 2022/0407720 A1 | 12/2022 | Ebrahimi et al. |

FOREIGN PATENT DOCUMENTS

| | | |
|---|---|---|
| JP | 2008518335 A | 5/2008 |
| JP | 2012114907 A | 6/2012 |
| KR | 20130055794 A | 5/2013 |
| WO | WO-2016179334 A1 | 11/2016 |
| WO | WO-2017152150 A1 | 9/2017 |
| WO | WO-2018145127 A1 | 8/2018 |
| WO | WO-2019113552 A1 | 6/2019 |

OTHER PUBLICATIONS

NIST ("Personal Identity Verification (PIV) of Federal Employees and Contractors", FIPS PUB 201-1, Aug. 2003 (Year: 2003).*

Barreto, P. S. L. M. et al., (2001) "Fast hashing onto elliptic curves over fields of characteristic 3," [Online], Cryptology ePrint Archive: Report 2001/098, Received Nov. 15, 2001, Retrieved from the Internet: URL: https://eprint.iacr.org/2001/098/, 12 pages.

Biggs, J., "Your Next Passport Could be on the Blockchain", Oct. 31, 2014, 6 pages.

Boneh, D. et al., (2001) "Short signatures from the Weil pairing," International Conference on the Theory and Application of Cryptology and Information Security, Asiacrypt 2001: Advances in Cryptology, [Online], Retrieved from the Internet: URL: https://www.iacr.org/archive/asiacrypt2001/22480516.pdf, pp. 516-534.

Dillet, R., "Stampery Now Lets You Certify Documents Using the Blockchain and Your Real Identity," Nov. 20, 2015, 6 pages.

Drew-Cordell, "Developer Creates Blockchain Passport Technology Based on Bitcoin", Oct. 31, 2014, 16 pages.

Ellis, C., "Create Your Own Blockchain ID", Bitnation, Oct. 24, 2014, 14 pages.

Ellison, C. et al., (2000) "Ten risks of PKI: What you're not being told about public key infrastructure," Computer Security Journal, vol. 16, No. 1, pp. 1-8.

Eminagaoglu, M. et al., "A Two-Factor Authentication System with QR Codes for Web and Mobile Applications," 2014 Fifth International Conference on Emerging Security Technologies, IEEE, Sep. 2014, pp. 105-112.

Extended European Search Report for European Application No. 16790050.5, mailed Apr. 26, 2018, 10 pages.

Extended European Search Report for European Application No. 17760964.1, mailed Oct. 24, 2019, 11 pages.

Extended European Search Report for European Application No. 18885688.4, mailed Jul. 23, 2021, 5 pages.

Extended European Search Report for European Application No. 21181229.2, mailed Jan. 14, 2022, 9 pages.

Extended European Search Report for European Application No. 22020427.5, mailed Dec. 14, 2022, 6 pages.

Extended European Search Report for European Application No. 22156663.1, mailed Sep. 7, 2022, 9 pages.

Github, Inc., "World Citizenship, Creating Affordable Decentralised Passport Services Using Available Cryptographic Tools," (Oct. 2014), Retrieved from the Internet on Nov. 17, 2017, URL: https://github.com/MrChrisJ/World-Citizenship , 12 pages.

Gupta, V., "State in a Box—Identity Services Architecture," CheapID, 2006-2009, 42 pages.

International Search Report and Written Opinion for International Application No. PCT/US2016/030863, mailed Sep. 14, 2016, 9 pages.

(56) References Cited

OTHER PUBLICATIONS

International Search Report and Written Opinion for International Application No. PCT/US2017/020829, mailed Jul. 17, 2017, 12 pages.
International Search Report and Written Opinion for International Application No. PCT/US2018/017136, mailed Apr. 26, 2018, 12 pages.
International Search Report and Written Opinion for International Application No. PCT/US2018/064623, mailed May 14, 2019, 7 pages.
Kirk, J., "Could the Bitcoin network be used as an ultrasecure notary service?", IDG News Service, Computerworld, Inc., May 23, 2013, 3 pages.
Menezes, A. J. et al., Chapter 9: Handbook of Applied Cryptography, CRC Press, Boca Raton, FL, pp. 321-383 (Oct. 1996).
Nakamoto, S., "Bitcoin: A peer-to-peer electronic cash system," Retrieved from the Internet: URL :< url: http://www.bitcoin.org , Jan. 2009, 9 pages</url:.
Notice of Reasons for Refusal for Japanese Application No. 2018-510317, mailed Sep. 1, 2020, 6 pages.
Office Action for European Application No. 16790050.5, mailed Nov. 21, 2019, 7 pages.
Office Action for European Application No. 17760964.1, mailed Oct. 20, 2020, 3 pages.
Office Action for U.S. Appl. No. 15/146,872, mailed Jun. 15, 2017, 12 pages.
Office Action for U.S. Appl. No. 15/146,872, mailed Sep. 27, 2016, 8 pages.
Office Action for U.S. Appl. No. 15/146,881, mailed Oct. 13, 2016, 8 pages.
Office Action for U.S. Appl. No. 15/208,580, mailed Jul. 7, 2017, 9 pages.
Office Action for U.S. Appl. No. 15/208,580, mailed Mar. 21, 2017, 8 pages.
Office Action for U.S. Appl. No. 15/208,580, mailed Oct. 25, 2017, 9 pages.
Office Action for U.S. Appl. No. 15/449,902, mailed Jun. 19, 2019, 10 pages.
Office Action for U.S. Appl. No. 15/640,795, mailed May 24, 2019, 8 pages.
Office Action for U.S. Appl. No. 15/784,093, mailed Apr. 15, 2019, 11 pages.
Office Action for U.S. Appl. No. 15/784,093, mailed Nov. 29, 2018, 9 pages.
Office Action for U.S. Appl. No. 15/878,353, mailed Aug. 8, 2018, 14 pages.
Office Action for U.S. Appl. No. 16/018,773, mailed Apr. 30, 2021, 45 pages.
Office Action for U.S. Appl. No. 16/018,773, mailed Jul. 28, 2020, 34 pages.
Office Action for U.S. Appl. No. 16/019,411, mailed Apr. 12, 2019, 12 pages.
Office Action for U.S. Appl. No. 16/019,411, mailed Sep. 16, 2019, 9 pages.
Office Action for U.S. Appl. No. 16/214,029, mailed Apr. 30, 2021, 22 pages.
Office Action for U.S. Appl. No. 16/214,029, mailed Oct. 22, 2020, 24 pages.
Office Action for U.S. Appl. No. 16/227,632, mailed Oct. 27, 2020, 9 pages.
Office Action for U.S. Appl. No. 16/656,459, mailed Sep. 24, 2020, 8 pages.
Office Action for U.S. Appl. No. 16/697,110, mailed Aug. 4, 2020, 7 pages.
Office Action for U.S. Appl. No. 16/697,131, mailed Apr. 26, 2021, 6 pages.
Office Action for U.S. Appl. No. 16/697,131, mailed Oct. 16, 2020, 12 pages.
Office Action for U.S. Appl. No. 16/986,817, mailed Apr. 6, 2021, 10 pages.
Office Action for U.S. Appl. No. 17/121,971, mailed Sep. 15, 2022, 13 pages.
Office Action for U.S. Appl. No. 17/370,731, mailed Apr. 25, 2022, 12 pages.
Office Action for U.S. Appl. No. 17/480,673, mailed Nov. 25, 2022, 6 pages.
Office Action for U.S. Appl. No. 17/551,585, mailed Mar. 6, 2023, 25 pages.
Office Action for U.S. Appl. No. 17/680,762 mailed Feb. 6, 2023, 11 pages.
Office Action for U.S. Appl. No. 17/738,106, mailed Jul. 11, 2022, 11 pages.
Panchamia, S. et al., "Passport, VISA and Immigration Management using Blockchain," 2017 23rd Annual Conference on Advanced Computing and Communications, 2018, 10 pages.
Partial European Search Report for European Application No. 22156663.1, mailed Jun. 3, 2022, 10 pages.
Stallings, W, Chapter 10: Digital Signatures and Authentication Protocols In: Cryptography and network security: Principles and Practice, Second Edition, p. 299-314, 1998.
Vapen, A. et al., "2-clickAuth Optical Challenge-Response Authentication," 2010 International Conference on Availability, Reliability, and Security, IEEE, Piscataway, NJ, Feb. 2010, pp. 79-86.
Office Action for U.S. Appl. No. 17/121,971, mailed Apr. 21, 2023, 15 pages.
Office Action for U.S. Appl. No. 17/386,787, mailed Apr. 26, 2023, 22 pages.
Office Action for U.S. Appl. No. 17/732,746, mailed Mar. 16, 2023, 12 pages.
Office Action for U.S. Appl. No. 17/752,536, mailed Jan. 4, 2024, 9 pages.

* cited by examiner

SYSTEMS, APPARATUS AND METHODS FOR SECURE ELECTRICAL COMMUNICATION OF BIOMETRIC PERSONAL IDENTIFICATION INFORMATION TO VALIDATE THE IDENTITY OF AN INDIVIDUAL

CROSS-REFERENCE TO RELATED APPLICATIONS

This application is a continuation of U.S. patent application Ser. No. 17/738,106 filed May 6, 2022, entitled "Systems, Apparatus and Methods for Secure Electrical Communication of Biometric Personal Identification Information to Validate the Identity of an Individual," now U.S. Pat. No. 11,544,367, which is a continuation of U.S. patent application Ser. No. 17/691,597, filed Mar. 10, 2022, entitled "Systems, Apparatus and Methods for Secure Electrical Communication of Biometric Personal Identification Information to Validate the Identity of an Individual," which is a continuation of U.S. patent application Ser. No. 17/514,667, filed Oct. 29, 2021, entitled "Systems, Apparatus and Methods for Secure Electrical Communication of Biometric Personal Identification Information to Validate the Identity of an Individual," which is a continuation of U.S. patent application Ser. No. 16/018,773, filed Jun. 26, 2018, entitled "Identity Management Service Using a Blockchain Providing Identity Transactions between Devices," which is a continuation-in-part of U.S. patent application Ser. No. 15/146,872, filed May 4, 2016, entitled "Identity Management Service Using a Blockchain Providing Identity Transactions between Devices," now U.S. Pat. No. 10,007,913, which claims priority to and the benefit of U.S. Provisional Application No. 62/304,934, filed Mar. 7, 2016, entitled "Identity Management Service using a Block Chain," and U.S. Provisional Application No. 62/157,256, filed May 5, 2015, entitled "Identity Management Service using a Block Chain," the disclosure of each of which is incorporated herein by reference in its entirety.

BACKGROUND

The present application generally relates to systems, apparatus and methods for secure electrical communication of biometric personal identification information to validate the identity of an individual. Specifically, the present application relates to use of a distributed database for identity validation using body characteristics and/or biometric personal identification information.

In some known systems, biometrics can be stored and used for identity validation. Such systems, however, are often insecure and inefficient. Specifically, such known systems are subject to data breaches leaving biometric data of users exposed. Moreover, such known systems are often difficult for multiple entities to use to validate an identity of an individual using biometrics.

Accordingly, a need exists for secure and efficient systems, apparatus and methods for secure electrical communication of biometric personal identification information to validate the identity of an individual.

SUMMARY

An apparatus for validating an identity of an individual based on biometrics includes a memory and a processor operatively coupled to a distributed database and the memory. The processor is configured to receive encrypted biometric data associated with a compute device and decrypt the biometric data using a private key associated with the processor to obtain biometric data. The processor is configured to provide the biometric data as an input to a predefined hash function to obtain a first biometric hash value. The processor is configured to receive a first pointer to a record in the distributed database including a signed second biometric hash value and obtain, using the first pointer, the second biometric hash value from the distributed database. The processor is configured to validate an identity of a user of the compute device in response to verifying that a signature of the signed second biometric hash value is associated with the compute device using a public key of the compute device and verifying that the first biometric hash value corresponds with the second biometric hash value. The processor is configured to define a certification based on the validating; digitally sign the certification using a private key associated with the processor to produce a signed biometric certification; store the signed biometric certification in the distributed database; and provide, to the compute device, a second pointer to the signed biometric certification in the distributed database such that the compute device can provide the second pointer to a relying entity.

BRIEF DESCRIPTION OF THE DRAWINGS

Corresponding reference characters indicate corresponding parts throughout the drawings.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

An apparatus for validating an identity of an individual based on biometrics includes a memory and a processor operatively coupled to a distributed database and the memory. The processor is configured to receive encrypted biometric data associated with a compute device and decrypt the biometric data using a private key associated with the processor to obtain biometric data. The processor is configured to provide the biometric data as an input to a predefined hash function to obtain a first biometric hash value. The processor is configured to receive a first pointer to a record in the distributed database including a signed second biometric hash value and obtain, using the first pointer, the second biometric hash value from the distributed database. The processor is configured to validate an identity of a user of the compute device in response to verifying that a signature of the signed second biometric hash value is associated with the compute device using a public key of the compute device and verifying that the first biometric hash value corresponds with the second biometric hash value. The processor is configured to define a certification based on the validating; digitally sign the certification using a private key associated with the processor to produce a signed biometric certification; store the signed biometric certification in the distributed database; and provide, to the compute device, a second pointer to the signed biometric certification in the distributed database such that the compute device can provide the second pointer to a relying entity.

Figure 1A:
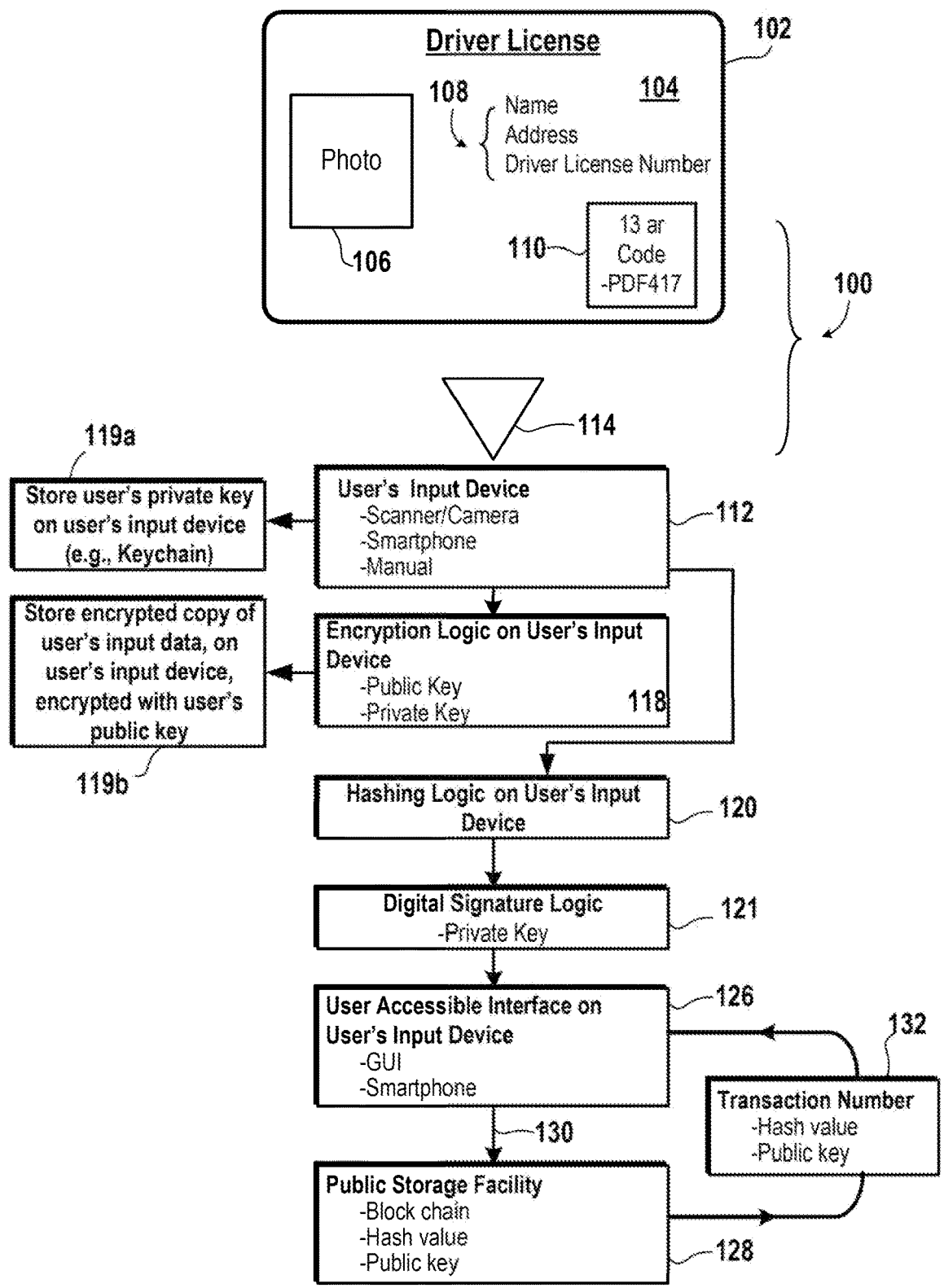
FIG. 1A shows a simplified block diagram of a system and method for sealing an identity of a person in a public storage facility.

FIG. 1A shows a simplified block diagram for a system 100 and method for managing the identity of a user by way of making verifiable transactions with a public storage facility 128. By way of example, an identification card 102 may be used. In other embodiments, other forms of identification, which may be digital or non-digital may be used. In the example of the identification card 102, personal data 104 is contained thereon, which identifies the user. The personal data can include a photo 106 of the user; the user's name, address and driver license number 108, and/or a bar code 110 or similar computer code for storing, scanning and/or retrieving additional data. Such coding can include PDF417 codes, QR codes, and other such codes. However, it is not necessary to have such code and the identification card may only have human-readable text strings. As noted above, the identification card 102 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 102 can be a government issued form of identification such as a driver license, passport, employee badge, military identification, political documentation, or the like. The identification card 102 can also be a privately issued form of identification such as a student ID, library card, social club card, or any other form of identification issued by a third party.

In one embodiment, as indicated by triangle 114, an input device 112 may be used to input such personal data from the identification card 102 to provide input data. Input device 112 can take many forms. For example, input device 112 can be a digital scanner, digital camera, or smartphone (e.g., with the camera commonly found in smartphones) for reading data from the identification card 102, including any codes appearing on the card 102. The input device 112 can also be a device for manually inputting personal data such as a keyboard, touchscreen, voice recognition device, handwriting recognition device, or other manual input device.

As shown in FIG. 1A, the input data can be optionally encrypted by encryption logic 118 and securely stored in operation 119b. In one implementation, the input data is transferred directly to hashing logic 120, without passing through encryption logic 118. For ease of understanding, the operations of the optional encryption logic 118 will be discussed first, and then the operations processed by the hashing logic 120. As such, the process may proceed directly from receiving the user information via 112 to the hashing logic 120.

The input data collected from the input device 112 (e.g., a user's smartphone) is passed to encryption logic 118 on input device 112. In an example embodiment, encryption logic 118 might include software, firmware, hardware, or any combination thereof, and consist of one or more encryption algorithms, e.g., an RSA encryption algorithm. Encryption logic 118 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. As shown in operation 119b, this encrypted data can then be stored locally on the input device 112 for added security. It can then only be accessed with the private key of the user on the input device 112, which might be stored in a more secure part of input device 112, e.g., "the Keychain", in operation 119a, if input device 112 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 112. It should be understood that the private key may be stored on another device, but similar or additional security should be processed to ensure that the private key is not compromised.

As noted above, the operations to be performed by the hashing logic 120 can proceed directly after receiving the input data from the input device 112. In this embodiment, the hashing logic 120 is used for hashing the input data (e.g., personal information collected) to provide or generate a hash value. The hash value is sometimes referred to as "hash data," that is generated by an algorithm. In an example embodiment, hashing logic 120 might be software, firmware, hardware, or any combination thereof, and consist of one or more hashing algorithms, e.g., a Secure Hash Algorithm (SHA) algorithm. Hashing logic 120 passes the hash value to digital-signature logic 121, which performs a digital signature on the hash value, using the private key on the input device 112. In an example embodiment, digital-signature logic 121 might be a component (or module) of encryption logic 118. In other embodiments, the digital-signature logic 121 may be defined by separate code, firmware, and/or hardware.

In one embodiment, the digital-signature logic 121 then passes the signed hash value and the public key to a user accessible interface 126 (e.g., a graphical user interface or GUI), which might be other software running on the input device 112. In an example embodiment, the user accessible interface 126 might be part of an application or app that includes encryption logic 118, hashing logic 120, and digital-signature logic 121, and/or other modules or code. The user accessible interface 126 might be used by the user to transmit the digitally signed hash value and the public key to a public storage facility 128 via a line 130, and receive back from the public storage facility 128 a transaction number 132 corresponding to the transmitted hash value and public key. As used in this disclosure, a "line" might be part of a wired and/or wireless connection or network, including a bus, an intranet, an internet, an extranet, a public computer network, a private computer network, etc., in an example embodiment. In an alternative example embodiment, only the signed hash value might be transmitted to public storage facility 128 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, must be kept secure, as noted above.

In one embodiment, the public storage facility 128 can take the form of a block chain (e.g., in a bitcoin online payment system) or any other public or private distributed database. The public storage facility 128 is connected to a communication link via a line and can be adapted to communicate over a public computer network, the internet, an intranet, an extranet, or any private communication network. Broadly speaking, the public storage facility 128 is accessible by any device that has an Internet connection over a network. A block chain, as is known in the art, is a system that enables users' access to securely store data in a public place. The data is deemed secure, as each time data is written, the written data is dependent on previously written data, which includes performing cryptographic hash operations. A benefit of using a block chain is that once data is written to the block chain and a block chain transaction is created, that transaction remains intact, and can be verified in the future. The reason for this, is that data is continually written to the block chain, e.g., after a particular transaction is made, and that later data is dependent on an earlier particular transaction. Consequently, by writing data to a public storage facility that implements a public block chain, later verification of that data is practically ensured to be correct. In one embodiment, a distributed public database is a block chain, which receives data for storage from a plurality of entities. The entities need not be related, and the type of data need not be the same. In general, entities storing the block chain are unrelated, and the type of data can vary to almost any type of digital data, e.g., not limited to identity data, commercial data, bitcoin data, etc. Thus, the data received for storage is configured to be processed to generate a transaction record that is dependent on previous data stored to the block chain. The transaction record being dependent on previous data stored to the block chain ensures that data stored to the block chain is not modifiable, as each later data stored to the block chain continues to be dependent on previous data stored to the block chain.

As indicated above, in an example embodiment, the input data might be hashed and the resulting hash value might be signed with a digital signature, created using a private key paired with a public key, before transmission, optionally along with the public key, from the input device (e.g., a user's smartphone) 112 to the public storage facility 128 for storage. The user accessible interface 126 is thus adapted to "seal" the signed hash value and the public key in the public storage facility 128. In one embodiment, once the hash value, and optionally the public key of the user is written to the block chain in a transaction, a later verification may be made if another party is able to hash the same input data.

Figure 1B:
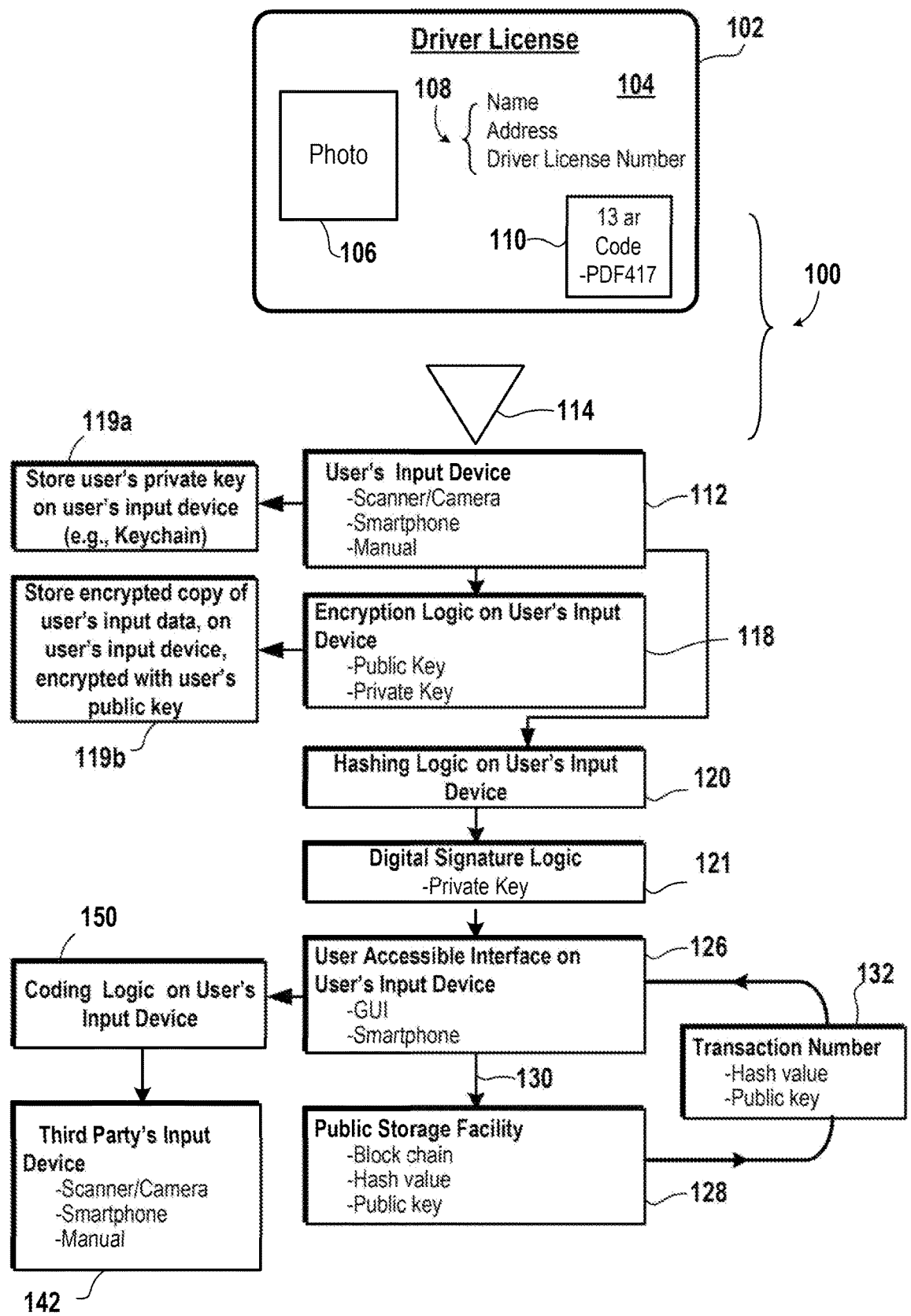
FIG. 1B also shows a simplified block diagram of a system and method for sealing an identity of a person in a public storage facility.

As depicted in FIG. 1B, user accessible interface 126 (e.g., a GUI) can be controllable by the user of the input device 112 to encrypt and provide the transaction number 132, the input data, and, optionally, the public key of the user, to an input device 142 (e.g., a smartphone) of a third party (e.g., a financial institution or other entity engaging in a commercial, private transaction, or other transaction with the user) to, for example, establish the identity of the user. In one embodiment, the third party will access the block chain using the transaction number 132 to retrieve the digitally signed hash value, and optionally, the public key if the public key has not been previously obtained by the third party from another source/location, and enable comparison with a hash value that is generated by the third party using the input data and the same hashing algorithm.

In an example embodiment, the encryption of the transaction number 132, the input data, and, optionally, the public key of the user might be performed by the encryption logic 118 using a public key of a third party paired with a private key of the third party. Then, coding logic 150 on the input device 112 might code the encrypted items into a barcode or QR code and the third party might use input device 142 to scan the barcode or QR code and decode it to gain access to the encrypted items. Thereafter, the third party might decrypt the encrypted items using the private key of the third party to perform a verification operation. In one embodiment, the verification may use an RSA algorithm as explained in further detail below. Other verification algorithms may also be used, depending on the configured implementation.

Figure 1C:
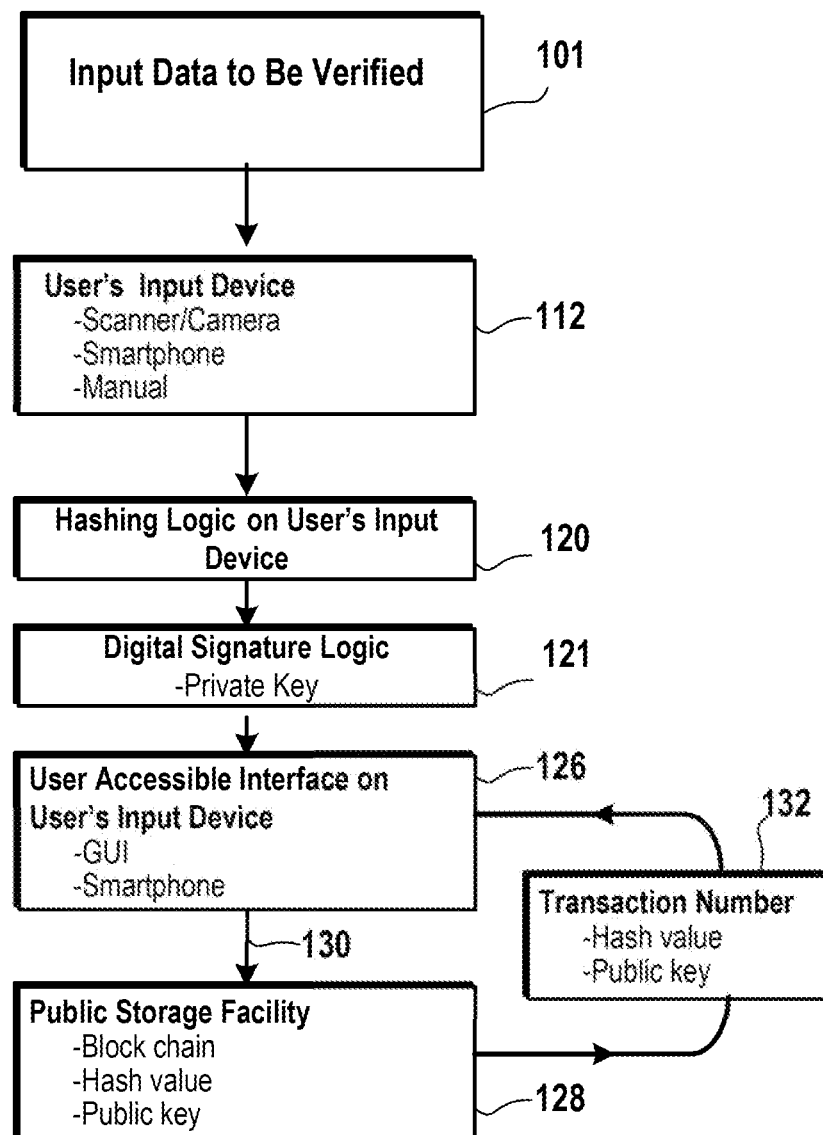
FIG. 1C shows a simplified block diagram of a system and method for sealing any input data in a public storage facility.

FIG. 1C shows a simplified block diagram of a system and method for sealing any input data in a public storage facility. As noted above, the operations to be performed by the hashing logic 120 can proceed directly after receiving the user information from the input device 112. In this embodiment, the hashing logic 120 is used for hashing the input data (e.g., personal information collected) to provide or generate a hash value. The hash value is sometimes referred to as "hash data," that is generated by an algorithm. In an example embodiment, hashing logic 120 might be software, firmware, hardware, or any combination thereof, and consist of one or more hashing algorithms, e.g., a Secure Hash Algorithm (SHA) algorithm. Hashing logic 120 passes the hash value to digital-signature logic 121, which performs a digital signature on the hash value, using the private key on the input device 112. In an example embodiment, digital-signature logic 121 might be a component (or module) of encryption logic 118. In other embodiments, the digital-signature logic 121 may be defined by separate code, firmware, and/or hardware.

In one embodiment, the digital-signature logic 121 then passes the signed hash value and the public key to a user accessible interface 126 (e.g., a graphical user interface or GUI), which might be other software running on the input device 112. In an example embodiment, the user accessible interface 126 might be part of an application or app that includes encryption logic 118, hashing logic 120, and digital-signature logic 121, and/or other modules or code. The user accessible interface 126 might be used by the user to transmit the digitally signed hash value and the public key to a public storage facility 128 via a line 130, and receives back from the public storage facility 128 a transaction number 132 corresponding to the transmitted hash value and public key. In an alternative example embodiment, only the signed hash value might be transmitted to public storage facility 128 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, must be kept secure, as noted above.

In one embodiment, the public storage facility 128 can take the form of a block chain (e.g., in a bitcoin online payment system) or any other public or private distributed database. The public storage facility 128 is connected to a communication link via a line and can be adapted to communicate over a public computer network, the internet, an intranet, an extranet, or any private communication network. Broadly speaking, the public storage facility 128 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 112 to the public storage facility 128 for storage. The user accessible interface 126 is thus adapted to "seal" the signed hash value and the public key in the public storage facility 128. In one embodiment, once the hash value, and, optionally, the public key of the user is written to the block chain in a transaction, a later verification may be made if another party is able to hash the same input data.

Figure 2A:
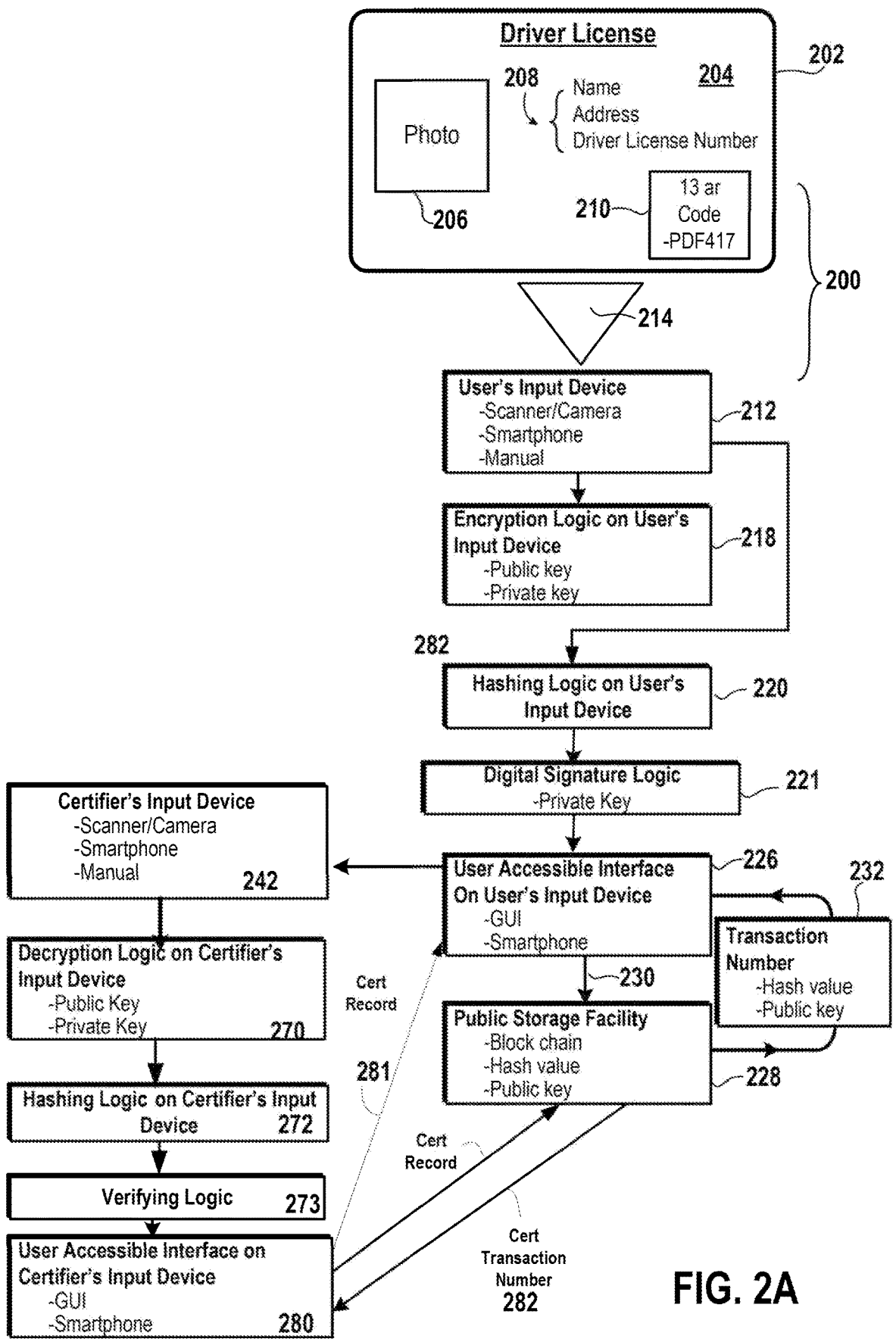
FIG. 2A shows a simplified block diagram of a system and method for certifying an identity of a person.

FIG. 2A shows a simplified block diagram for a certification method for managing the identity of a user in a public storage facility 228. By way of example, an identification card 202 may be used. In other embodiments, other forms of identification, which may be digital or non-digital may be used. In the example of the identification card 202, personal data 204 is contained thereon, which identifies the user. The input data can include a photo 206 of the user; the user's name, address and driver license number 208, and/or a bar code 210 or similar computer code for storing, scanning and/or retrieving additional data. Such coding can include PDF417 codes, QR codes, and other such codes. However, it is not necessary to have such code and the identification card may only have human-readable text strings. As noted above, the identification card 202 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 202 can be a government issued form of identification such as a driver license, passport, employee badge, military identification, political documentation, or the like. The identification card 202 can also be a privately issued form of identification such as a student ID, library card, social club card, or any other form of identification issued by a third party.

In one embodiment, as indicated by triangle 214, an input device 212 may be used to input such personal data from the identification card 202 to provide input data. Input device 212 can take many forms. For example, input device 212 can be a digital scanner, digital camera, or smartphone (e.g., with the camera commonly found in smartphones) for reading data from the identification card 202, including any codes appearing on the card 202. The input device 212 can also be a device for manually inputting personal data such as a keyboard, touchscreen, voice recognition device, handwriting recognition device, or other manual input device.

As shown in FIG. 2A, the input data can be optionally encrypted by encryption logic 218 and securely stored. In one implementation, the input data is transferred directly to hashing logic 220, without passing through encryption logic 218. For ease of understanding, the operations of the optional encryption logic 218 will be discussed first, and then the operations processed by the hashing logic 220. As such, the process may proceed directly from receiving the user information via 212 to the hashing logic 220.

The input data collected from the input device 212 (e.g., a user's smartphone) is passed to encryption logic 218 on input device 212. In an example embodiment, encryption logic 218 might include software, firmware, hardware, or any combination thereof, and consist of one or more encryption algorithms, e.g., an RSA encryption algorithm. Encryption logic 218 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 212 for added security. It can then only be accessed with the private key of the user on the input device 212, which might be stored in a more secure part of input device 212, e.g., "the Keychain", if input device 212 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 212. It should be understood that the private key may be stored on another device, but similar or additional security should be processed to ensure that the private key is not compromised.

As noted above, the operations to be performed by the hashing logic 220 can proceed directly after receiving the input data from the input device 212. In this embodiment, the hashing logic 220 is used for hashing the input data (or selected fields of the input data or personal data) to provide or generate a hash value. The hash value is sometimes referred to as "hash data," that is generated by an algorithm. In an example embodiment, hashing logic 220 might be software, firmware, hardware, or any combination thereof, and consist of one or more hashing algorithms, e.g., a Secure Hash Algorithm (SHA) algorithm. Hashing logic 220 passes the hash value to digital-signature logic 221, which performs a digital signature on the hash value, using the private key on the input device 212. In an example embodiment, digital-signature logic 221 might be a component (or module) of encryption logic 218. In other embodiments, the digital-signature logic 221 may be defined by separate code, firmware, and/or hardware.

In one embodiment, the digital-signature logic 221 then passes the signed hash value and the public key to a user accessible interface 226 (e.g., a graphical user interface or GUI), which might be other software running on the input device 212. In an example embodiment, the user accessible interface 226 might be part of an application or app that includes encryption logic 218, hashing logic 220, and digital-signature logic 221, and/or other modules or code. The user accessible interface 226 might be used by the user to transmit the digitally signed hash value and, optionally, the public key to a public storage facility 228 via a line 230, and receive back from the public storage facility 228 a transaction number 232 corresponding to the transmitted hash value and public key.

In one embodiment, the public storage facility 228 can take the form of a block chain (e.g., in a bitcoin online payment system) or any other public or private distributed database. The public storage facility 228 is connected to a communication link via a line and can be adapted to communicate over a public computer network, the internet, an intranet, an extranet, or any private communication network. Broadly speaking, the public storage facility 228 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 212 to the public storage facility 228 for storage. The user accessible interface 226 is thus adapted to "seal" the signed hash value and the public key in the public storage facility 228. In one embodiment, once the hash value, and, optionally, the public key of the user is written to the block chain in a transaction, a later verification may be made if another party is able to hash the same input data.

The user accessible interface 226 (e.g., a GUI) can be controllable by the user of the input device 212 to encrypt and provide the transaction number 232, the input data (or selected fields of the input data), and, optionally, the public key to an input device 242 (e.g., a smartphone) of a certifier. In an example embodiment, the encryption might be performed by the encryption logic 218 using a public key of a certifier paired with a private key of the certifier. Then, coding logic on the input device 212 might code the encrypted transaction number 232, the input data (or selected fields of the input data), and, optionally, the public key into a barcode or QR code and the certifier might use input device 242 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 242 receives the barcode or QR code, decoding logic on the certifier's input device 212 might decode the barcode or QR code and decryption logic 270 on the certifier's input device 242 might use the certifier's private key to decrypt the encrypted items. In an example embodiment, decryption logic 270 might be a component (or module) of more general encryption logic. In one embodiment, the decrypted input data (or selected fields of the input data) might be hashed into a hash value by hashing logic 272 on the certifier's input device 242, using the same hashing algorithm that was used to create the hash value that was digitally signed by the user. And the decrypted transaction number 232 might be used by a user accessible interface 280 (e.g., a GUI) to access the public storage facility 228 (e.g., the block chain) and retrieve the signed hash value and public key of the user. The retrieved signed hash value, the generated hash value, and the retrieved or obtained public key might then be input to verifying logic 273 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 273 might be a component (or module) of decryption logic 270. In another embodiment, the verifying logic 273 may be a separate module, software, firmware and/or hardware. As indicated above, in an example embodiment, the public key of the user might be obtained from some other source than the public storage facility 228 (e.g., from the user), in an example embodiment.

Figures 1, 2B:
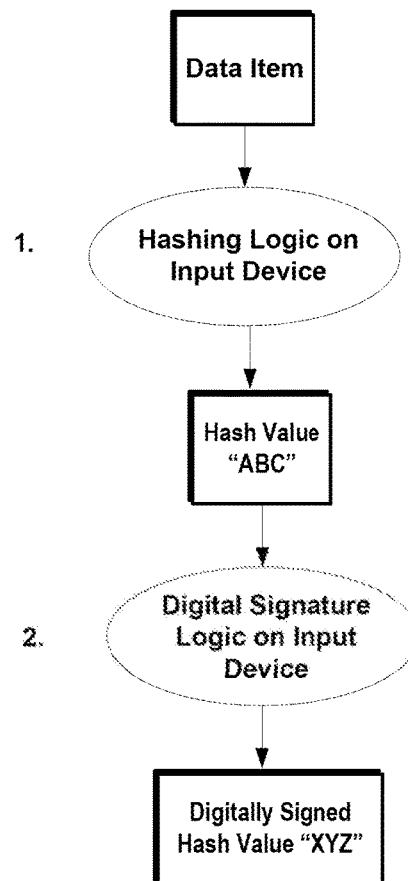
FIGS. 2B-1 and 2B-2 show a process for verifying hashed input data and a digital signature.
Figures 2, 2B:
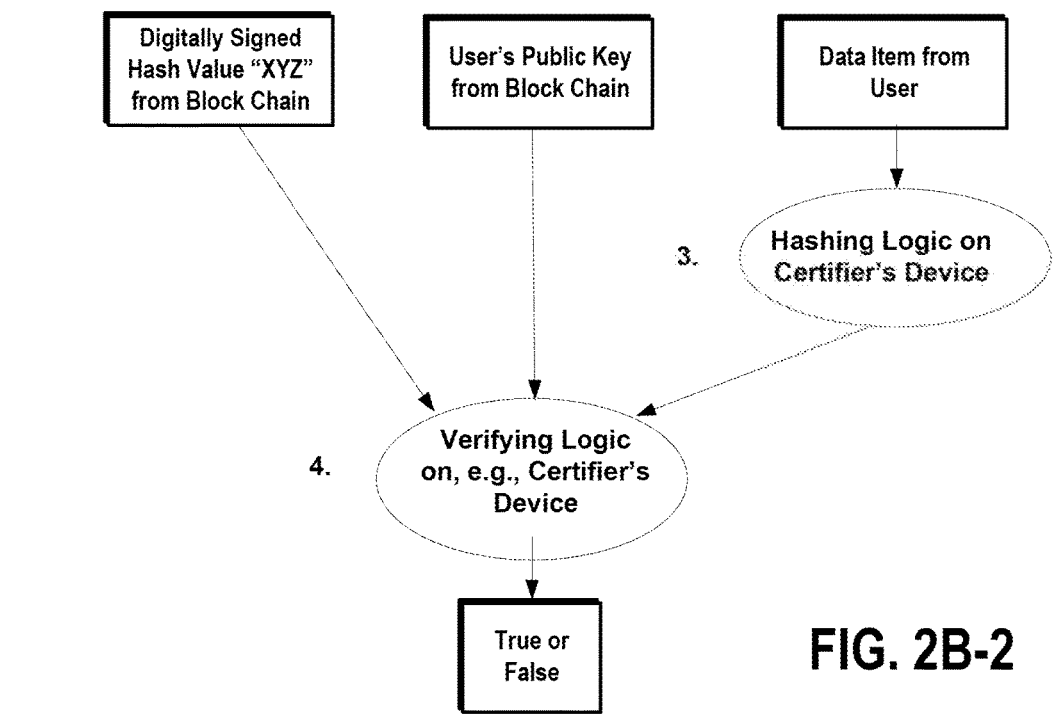

This verification process is depicted in FIGS. 2B-1 and 2B-2. FIG. 2B-1 shows how a digitally signed hash value is created from input data. The input data (or selected fields of the input data) is hashed into a hash value "ABC" by hashing logic 220 on the user's input device 112, in operation 1. Then the hash value "ABC" is digitally signed with the user's private key using digital-signature logic 121 to create digitally signed hash value "XYZ", in operation 2.

FIG. 2B-2 shows how a digitally signed hash value is verified after being retrieved along with the public key of the user from the public storage facility 228. The input data (or selected fields of the input data) is received from the user's input device 212 at the certifier's input device 242 and is hashed into a generated hash value "ABC" using hashing logic 272, in operation 3. Then the signed hash value "XYZ", the generated hash value "ABC", and the user's public key are input to verification logic 273 in operation 4. The verification logic 273 might include a RSA verification algorithm, in an example embodiment. If the hash value in the digitally signed hash value "XYZ" is the same as the generated hash value "ABC" and the digital signature was signed with a private key that is associated with the user's public key, the verification logic 273 returns a value of "true". Otherwise the verification logic 273 returns a value of "false". It should be understood that the verification logic 273 may be executed on any device (e.g., a user's device, a certifier's device, a verifier's device, a third party's device, a commercial entity's device, a private entity's device, etc.), that needs to perform a verification operation.

Upon receipt of a "true" value from encryption logic 270, the certifier might create a certification record that refers to the verification. In an example embodiment, the certification record might include the transaction number 232, the input data (or selected fields of the input data), received from the user, and, optionally, a timestamp, and the certification record might be hashed and digitally signed by the certifier using a private key of the certifier associated with a public key. Then the certifier might use user accessible interface 280 (e.g., a GUI) to transmit the signed certification record to the public storage facility 228 for storage and receive in return transaction number 282 from the public storage facility 228. In an example embodiment, the certifier might encrypt the certification record with the certifier's public key before transmission to the public storage facility 228, in order to keep the certification record private.

It will be appreciated that the verification process shown in FIGS. 2B-1 and 2B-2 might be used to verify the digital signature on items of data other than the input data (or selected fields of the input data) received by input device 212. In an example embodiment, the item of data that is digitally signed might not be hashed before being digitally signed. In an example embodiment, the verification process shown in FIGS. 2B-1 and 2B-2 might be used to verify a digitally-signed hash of a document other than an identification card, e.g., a digitally-signed certification as described above or a digitally-signed acknowledgement as described below. Or, the same verification process might be used to verify a digitally-signed token (e.g., random number) that is sent by a sender using a secure-envelope process. A secure-envelope process, as described below, might be used instead of, or in addition to, public-key encryption when transmitting data from a user to a certifier, verifier, third party, etc., and vice versa.

In an example embodiment, when using a secure envelope process, a sender might hash a real-time token (e.g., a random number generated by the user's remote device) and digitally sign the hashed token using the sender's private key. In an example embodiment, a timestamp might be optionally included with the token. Then the sender might transmit the signed hashed token and, optionally, the public key associated with the sender's private key to a distributed public database for storage, receiving a transaction number in return from the distributed public database. Thereafter, the sender might transmit the transaction number and the token to a receiver, e.g., a certifier, a verifier, a third party, etc., optionally, after encrypting the transaction number and the token with the receiver's public key. In an example embodiment, the receiver might receive the transaction number and token (optionally including the timestamp), decrypt them using the receiver's private key, if necessary, and then use the transaction number to retrieve the digitally signed hashed and, optionally, the sender's public key from the distributed public database. The receiver might generate a hash of the token using the same hashing algorithm the sender used. Then the receiver might verify, e.g., using an RSA verify call as described above, that the token in the generated hash is the same as the token in the digitally signed hash token and verify that the digital signature was created with the sender's private key. An RSA verify call may be, for example, processed by verifying logic 273, e.g., to execute a verify operation. In an example embodiment, the token (optionally including the timestamp) might not be hashed before being signed.

Figure 2C:
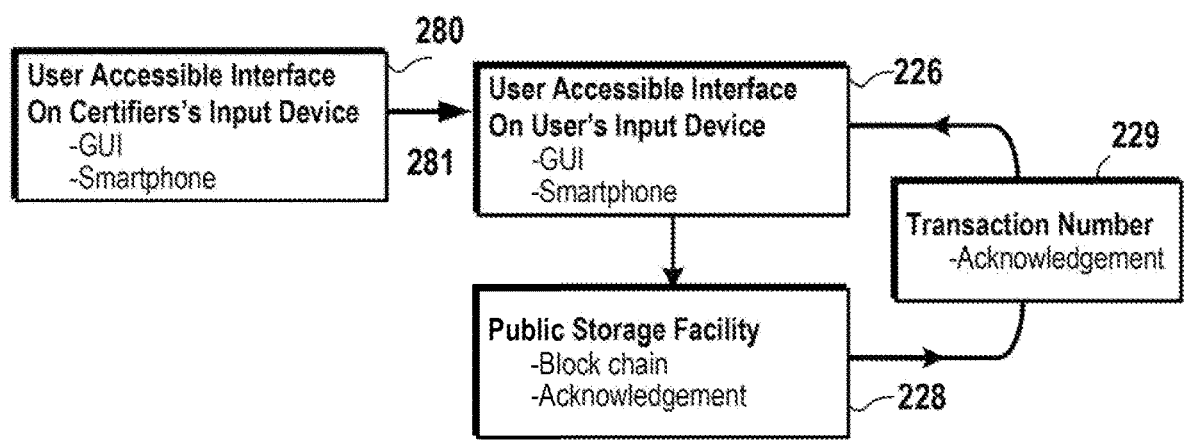
FIG. 2C shows a simplified block diagram for recording an acknowledgement.

In one configuration, as depicted in FIG. 2C, the certifier might encrypt the certification record and transaction number 282 (e.g., the transaction number the certifier received from the public storage facility 228) with the user's public key and transmit in 281 the encrypted certification record to the user, using user accessible interface 280 (e.g., a GUI). Upon receiving the encrypted certification record, the user might decrypt it using the user's private key and then create an acknowledgement record that refers to or includes the certification record, and optionally includes a timestamp, in order to link the two records in the public storage facility 228 to facilitate convenient lookup by a third party, if the certification record is verified. Here again, to verify the certification record, the user might hash the certification record using the same hashing algorithm that the certifier used prior to digital signature by the certifier. The user might use transaction number 282 to retrieve the signed certification record and the certifier's public key from the public storage facility 228. Then the user might verify that the certification record in the generated hash is the same as the certification record in the digitally signed certification record and verify that the digital signature was created with the certifier's private key, e.g., using an RSA verify call as described above.

In an example embodiment, the acknowledgement record might include the certification record, the transaction number 282, and optionally, a timestamp, and the user might digitally sign the acknowledgement record with the user's private key. Then the user might use user accessible interface 228 (e.g., a GUI) to transmit the signed acknowledgement record and the user's public key to the public storage facility 228 for storage and receive a transaction number 229 in response from the public storage facility 228. In an example embodiment, the user might encrypt the signed acknowledgement record with the user's public key before transmission to the public storage facility 228 in order to keep the acknowledgement record private.

Figure 3A:
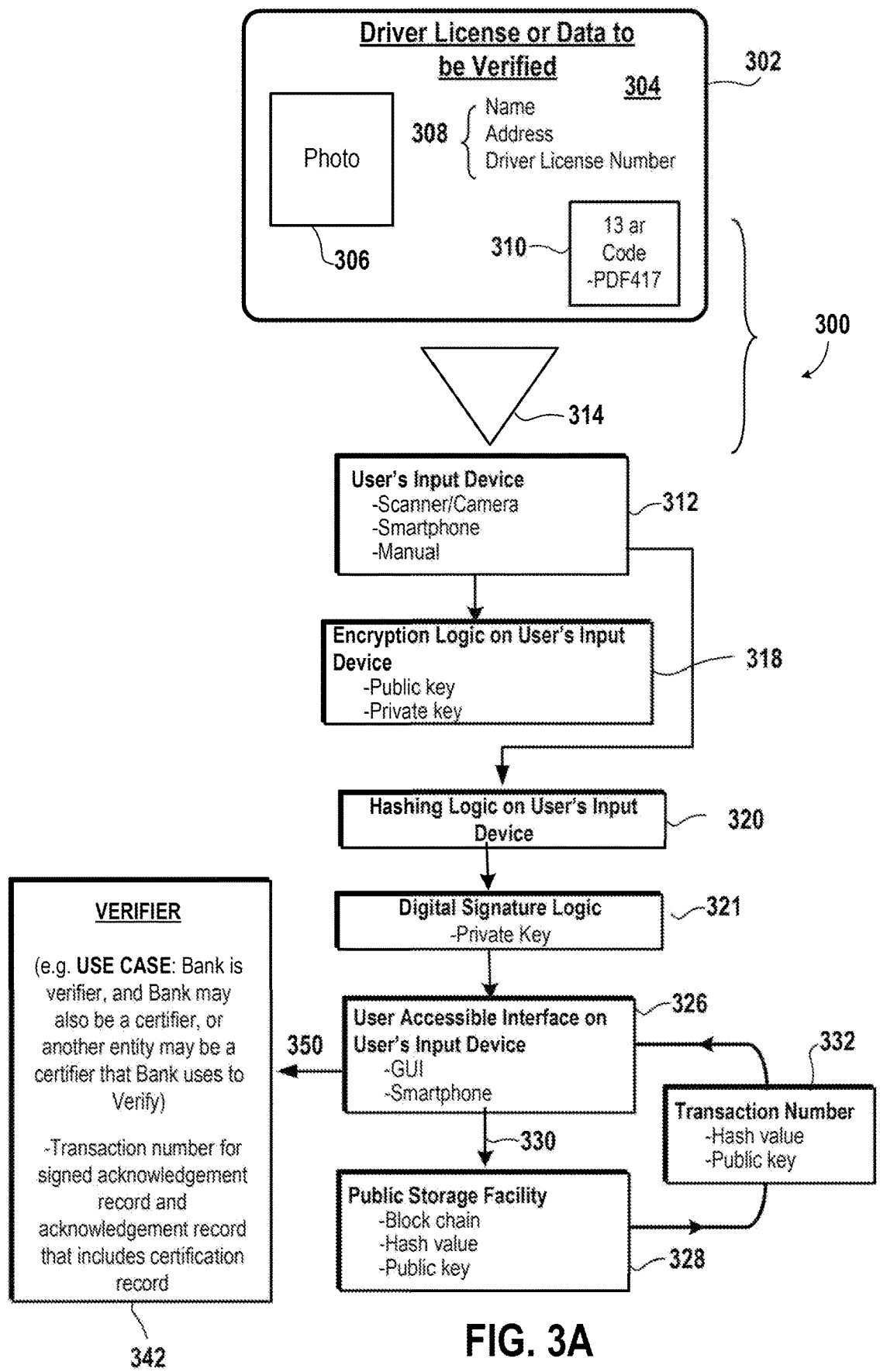
FIG. 3A shows a simplified block diagram of a system and method for verifying an acknowledgement record.

FIG. 3A shows a simplified block diagram for a system and method for certifying a pending transaction. By way of example, an identification card 302 may be used. In other embodiments, other forms of identification, which may be digital or non-digital may be used. In the example of the identification card 302, personal data 304 is contained thereon, which identifies the user. The personal data can include a photo 306 of the user; the user's name, address and driver license number 308, and/or a bar code 310 or similar computer code for storing, scanning and/or retrieving additional data. Such coding can include PDF417 codes, QR codes, and other such codes. However, it is not necessary to have such code and the identification card may only have human-readable text strings. As noted above, the identification card 302 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 302 can be a government issued form of identification such as a driver license, passport, employee badge, military identification, political documentation, or the like. The identification card 302 can also be a privately issued form of identification such as a student ID, library card, social club card, or any other form of identification issued by a third party.

In one embodiment, as indicated by triangle 314, an input device 312 may be used to input such personal data from the identification card 302 to provide input data. Input device 312 can take many forms. For example, input device 312 can be a digital scanner, digital camera, or smartphone (e.g., with the camera commonly found in smartphones) for reading data from the identification card 302, including any codes appearing on the card 302. The input device 312 can also be a device for manually inputting personal data such as a keyboard, touchscreen, voice recognition device, handwriting recognition device, or other manual input device.

As shown in FIG. 3A, the input data can be optionally encrypted by encryption logic 318 and securely stored. In one implementation, the input data is transferred directly to hashing logic 320, without passing through encryption logic 318. For ease of understanding, the operations of the optional encryption logic 318 will be discussed first, and then the operations processed by the hashing logic 320. As such, the process may proceed directly from receiving the user information via 312 to the hashing logic 320.

The input data collected from the input device 312 (e.g., a user's smartphone) is passed to encryption logic 318 on input device 312. In an example embodiment, encryption logic 318 might include software, firmware, hardware, or any combination thereof, and consist of one or more encryption algorithms, e.g., an RSA encryption algorithm. Encryption logic 318 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 312 for added security. It can then only be accessed with the private key of the user on the input device 312, which might be stored in a more secure part of input device 312, e.g., "the Keychain", if input device 312 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 312. It should be understood that the private key may be stored on another device, but similar or additional security should be processed to ensure that the private key is not compromised.

As noted above, the operations to be performed by the hashing logic 320 can proceed directly after receiving the user information from the input device 312. In this embodiment, the hashing logic 320 is used for hashing the input data (or selected fields of the input data or personal data) to provide or generate a hash value. The hash value is sometimes referred to as "hash data," that is generated by an algorithm. In an example embodiment, hashing logic 320 might be software, firmware, hardware, or any combination thereof, and consist of one or more hashing algorithms, e.g., a Secure Hash Algorithm (SHA) algorithm. Hashing logic 320 passes the hash value to digital-signature logic 321, which performs a digital signature on the hash value, using the private key on the input device 312. In an example embodiment, digital-signature logic 321 might be a component (or module) of encryption logic 318. In other embodiments, the digital-signature logic 321 may be defined by separate code, firmware, and/or hardware.

In one embodiment, the digital-signature logic 321 then passes the signed hash value and, optionally, the public key to a user accessible interface 326 (e.g., a graphical user interface or GUI), which might be other software running on the input device 312. In an example embodiment, the user accessible interface 326 might be part of an application or app that includes encryption logic 318, hashing logic 320, and digital-signature logic 321, and/or other modules or code. The user accessible interface 326 might be used by the user to transmit the digitally signed hash value and, optionally, the public key to a public storage facility 328 via a line 330, and receive back from the public storage facility 328 a transaction number 332 corresponding to the transmitted hash value and public key.

In one embodiment, the public storage facility 328 can take the form of a block chain (e.g., in a bitcoin online payment system) or any other public or private distributed database. The public storage facility 328 is connected to a communication link via a line and can be adapted to communicate over a public computer network, the internet, an intranet, an extranet, or any private communication network. Broadly speaking, the public storage facility 328 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 312 to the public storage facility 328 for storage. The user accessible interface 326 is thus adapted to "seal" the signed hash value and the public key in the public storage facility 328. In one embodiment, once the hash value, and, optionally, the public key of the user is written to the block chain in a transaction, a later verification may be made if another party is able to hash the same input data.

The user accessible interface 326 (e.g., a GUI) can be controllable by the user of the input device 312 to transmit, in 350, an acknowledgement record, a transaction number for a signed acknowledgement record, and optionally the user's public key to a verifier 342. In an example embodiment, transaction number 332 for the signed input data and the input data might also be transmitted to verifier 342, for verification using the verification process used by the certifier, as described above. As used herein, to provide broad understanding of the functions or operation of verifier 342, an example use case of a bank, being the verifier is provided. It should be understood that the verifier can be any entity that needs to verify identity, data, or transaction(s). Additionally, the certifier may be any entity that has certified identity, data, or transaction(s). Thus, in this use case example, the bank is not necessarily the same entity as the certifier, but in other circumstances, the bank may also be the certifier. By way of example, the bank may verify a certification made by another entity, e.g., a credit card company, a car company, a government agency, a private entity, etc. Acknowledgement records and transaction numbers for signed acknowledgement records were discussed in detail above with respect to FIG. 2C. As noted indicated above, the user might use encryption with the verifier's public key and/or a secure-envelope process for transmission 350.

Figure 3B:
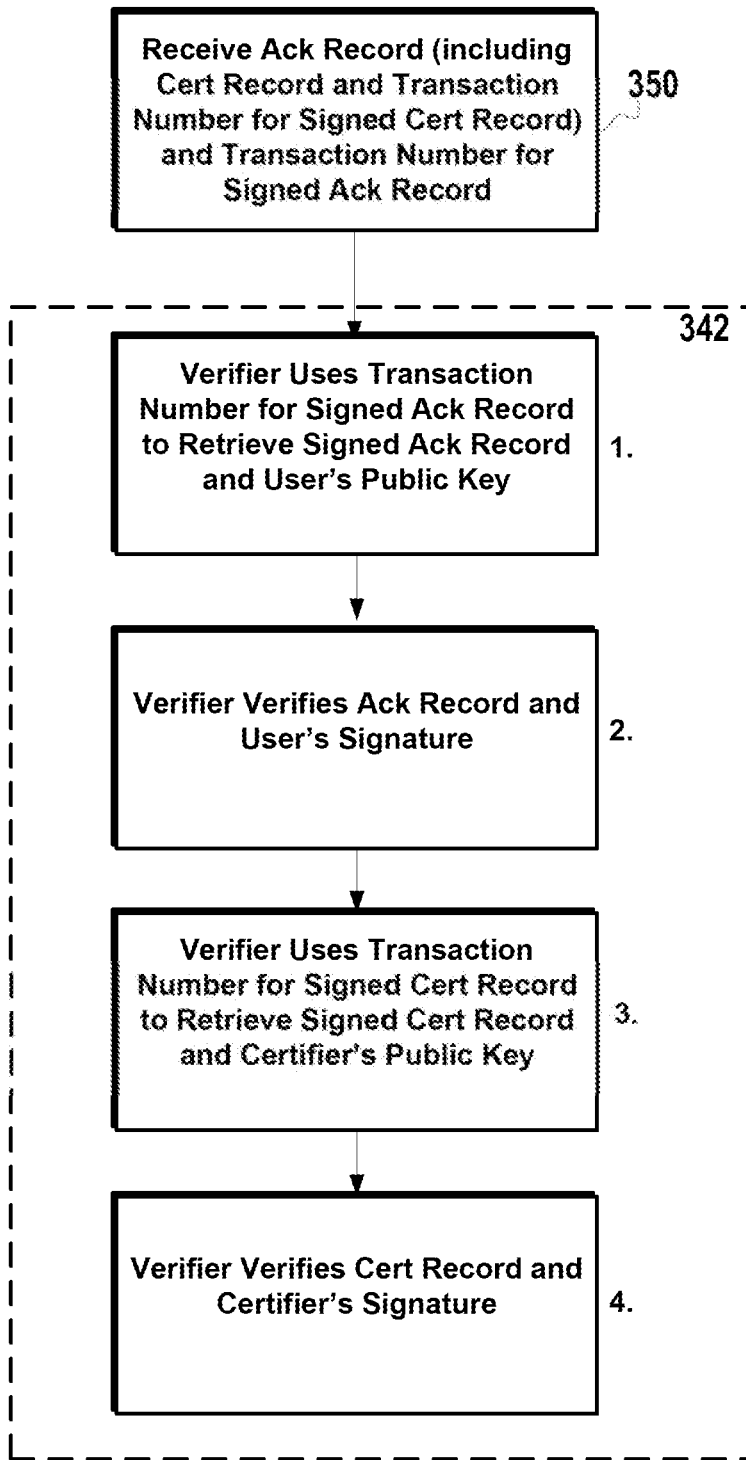
FIG. 3B shows a flowchart diagram for a method for verifying an acknowledgement record and its underlying certification record.

Once the verifier receives the acknowledgement record and the transaction number for the signed acknowledgement record, the verifier might use the process shown in FIG. 3B to verify the acknowledgement record and its underlying certification record. In operation 1, the verifier uses the transaction number to retrieve the signed acknowledgement record and, optionally, the user's public key from public storage facility 328. Then, in operation 2, the verifier hashes the acknowledgement record with the same hashing algorithm that was used by the user and verifies the acknowledgement record and the user's signature, using a verification algorithm as discussed in detail above. If the verification is successful, the verifier uses the transaction number for the signed certification record to retrieve the signed certification record and the certifier's public key from public storage facility 328, in operation 3. Then, in operation 4, the verifier hashes the certification record with the same hashing algorithm that was used by the certifier and verifies the certification record and the certifier's signature, using a verification algorithm as discussed in detail above. If this verification is also successful, the verifier might create another certification record as discussed above and transmit it to public storage facility 328, receiving, in response, another transaction number, which might be transmitted along with the verifier's certification record to the user for another acknowledgement record.

In the event the certification record and/or the acknowledgement record are optionally encrypted before transmission to the block chain, the user transmits an unencrypted acknowledgment record to the verifier and the verifier performs its verifications using the data in the unencrypted acknowledgement record. In an example embodiment, these verifications include checking that an acknowledgment record in fact exists in the block chain with the transaction number for the signed acknowledgement record. Also, in an example embodiment, the unencrypted acknowledgment record includes the transaction number of the signed certification record along with other unencrypted data from the certification record. Using the transaction number for the signed certification and the unencrypted data from the certification record, the verifier can confirm that the certification record in fact exists on the block chain and can process the unencrypted data in the certification record to verify the certifier's signature, even if the certification record was also encrypted before transmission to the block chain.

Certified User Generated Data (Biometrics)

A User may generate any type of data (UGD) and have that data Certified by a third party (Certifier). There are no limitations as to the type of data generated. The data can be any of the following types, but not limited only to these types of data: 1) a simple text string; 2) a date; 3) an enumerated data type; 4) a number; 5) an arbitrary series of data bytes (e.g., a data block).

For distinction, the data types would have a name associated with them, so they appear in the form: Name=Value.

This data would be saved locally on the Users' mobile App. The User would then Seal her record by writing this data to the blockchain. This can be done by either inserting a new Seal record with the added user generated data that overwrites any previous Seal (if any), or a new Seal that complements any prior Seals.

The value field written to the block chain is for validation of the original data only. The user is expected to hold onto that data and only share it when the user chooses to. Hence, the data is first hashed so the UGD becomes <hash.UGD>. Any number of hashing algorithms can be used such as SHA256. The user then signs the <hash.UGD> with its private key producing <signed.hash.UGD>. This becomes the value that is then written to the blockchain in the form: Name=<signed.hash.UGD>.

Once the record is sealed, the User may then present the UGD (maintained by the User or another device storage of his/her choosing), along with her public-key and a pointer to the Seal record on the blockchain to another party.

The other party (the Certifier) can then get the hash value of the UGD by hashing the data with the same algorithm. This produces <hash.UGD>. The Certifier can then use <hash.UGD>, the users' public-key and the <signed.hash.UGD> pointed to on the blockchain to confirm that the data given to it is what was Sealed on the blockchain.

The Certifier can then inspect the UGD in its clear form for authenticity, approval, or agreement.

If the Certifier chooses to, it may then certify that data. To Certify that record, it uses methods previously described to uniquely certify the <signed.hash.UGD>. By doing so, at any point in the future, the user may present the UGD along with a pointer to its Sealed record and the Certified record along with its public-key to the Certifier or any other third party. To the degree that these parties trust the original Certifier who certified the record, the third party or the Certifier can validate the certification and matching of the UGD to the signature on the blockchain and feel comfortable to use the UGD without separately authenticating, approving, or agreeing to the data. The UGD was previously authenticated, approved or agreed to by the Certifier, a trusted party.

The contents of the UGD may now be used for additional activities. If the UGD is a contract, its content can be trusted to the degree that the Certification attests to it. The UGD may be biometric data such as a fingerprint, facial image, iris-scan, voice, DNA-data or other biometric data. If the Certification represented a relationship of that data to the user, the third party presented with the data and the Certification can trust that association to the degree that it trusts the Certifier.

For example, if a government agency Certifies a users' UGD (that is a biometric data) as association of that biometric data with the given User, the User can later present that same UGD to the same government agency or anyone else who accepts that government agency's certification process (the Verifier). The Verifier can now capture a new biometric from the same person (e.g., capture a new finger print, a new facial image, a new DNA-sample, a new iris-scan, a new voice-sample, or other biometric data) and compare it with the UGD that the User presented. If the two match, the Verifier can be assured that this is the same individual as the person who was previous Certified by the government agency. This not only validates the Users' digital id presented, but also the physical person who just presented that.

Similar evaluations can be done with the UGD, if it is any other data such as a date, a simple text-string, an enumerated data-type, a number, or any arbitrary set of data bytes.

Figure 4A:
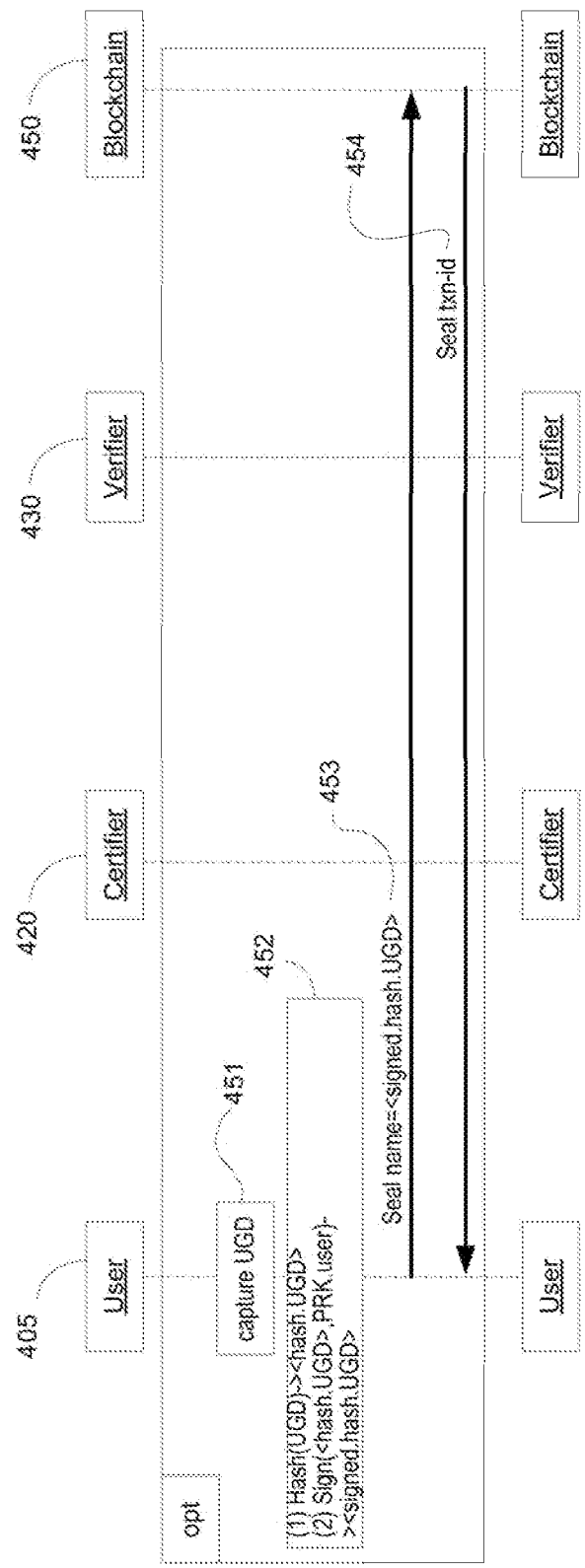
FIGS. 4A-4C are data flow diagrams illustrating the certification of user generated biometric data, in accordance with one embodiment of the present disclosure.
Figure 4B:
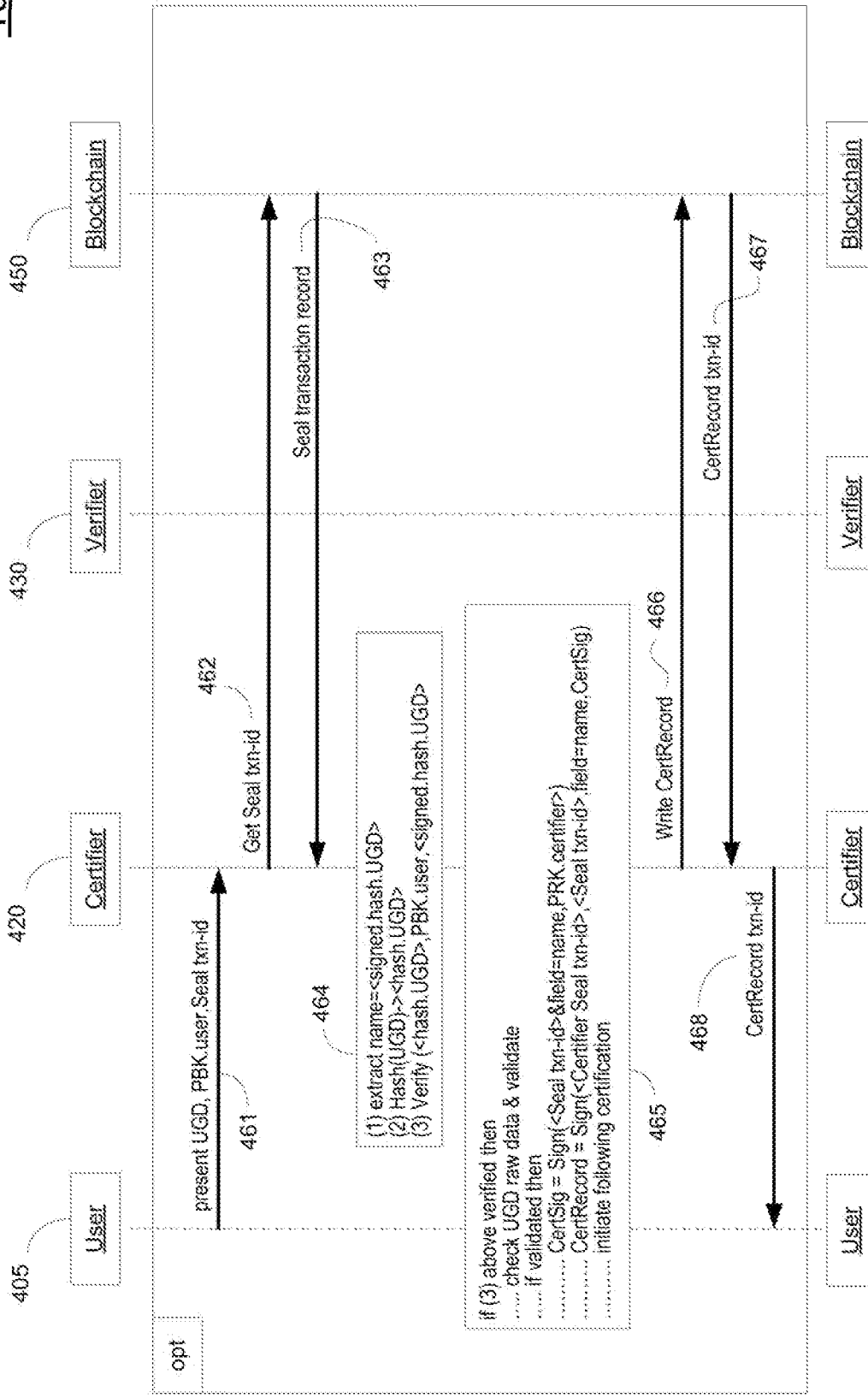
Figure 4C:
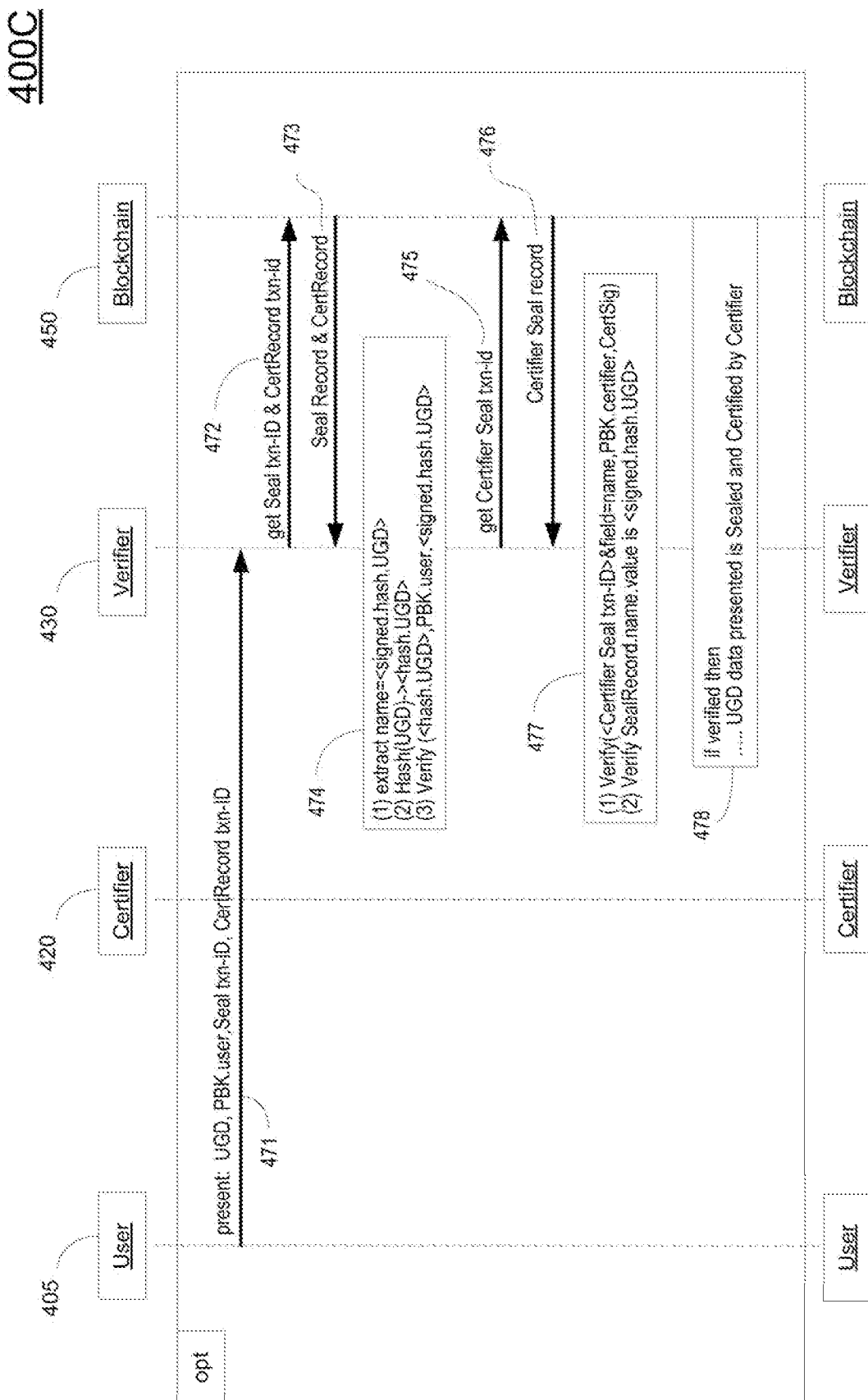

FIGS. 4A-4C combined illustrate in more detail the process for certifying user generated biometric data as described above, in accordance with embodiments of the present disclosure. In particular, FIG. 4A-4C are data flow diagrams illustrating the certification of user generated biometric data. Participants (e.g., devices, systems, etc.) include user 405, certifier 420, verifier 430, and blockchain 450.

FIG. 4A illustrates operations performed at the user 405. At 451, user generated data (UGD) is captured. At 452, the UGD is hashed to generate: <hash.UGD>. Also, a signature of the hashed UGD is performed using the private key of the user to generate: <signed.hash.UGD>. At 453, to seal the signature of the hashed UGD, a seal name is delivered to the blockchain, wherein the seal name is the signature of the hashed UGD. At 454, a seal transaction identifier ("Seal txn-ID") is returned to the user 405 from the blockchain 450.

FIG. 4B illustrates operations performed at the certifier 420. At 461, the user presents to the certifier 420 the user generated data (UGD), the public key of the user (PBK.user), and the seal transaction identifier (e.g., "Seal txn-ID"). At 462, the certifier 420 gets the seal record from the blockchain 450 using the seal transaction identifier (e.g., "Seal txn-ID"). At 463, the seal record is returned to the certifier 420 from the blockchain 450. At 464, from the seal record the signature of the hashed UGD (<signed.hash.UGD>) is extracted. A generated hash value (<hash.UGD>) is created by the certifier 420 by performing a hash operation on the user generated data received from the user. In addition, the certifier verifies that the generated hash value (<hash.UGD>) matches the hash value in the signature of the hashed UGD (<signed.hash.UGD>) using in part the public key of the user. At 465, if the generated hash value is verified at 466, then the raw data of the user generated data (UGD) is checked for validation purposes. If the raw UGD is validated, then a certification signature of the seal transaction identifier (e.g., "Seal txn-ID"), and possibly other data, is generated using the private key of the certifier is generated ("CertSig"). Also, a certification record ("CertRecord") is generated by signing the certifier seal transaction identifier, the seal transaction identifier, and possibly other information such as the field=name, and CertSig. Thereafter, a certification is performed. In particular, the certification record is written and/or sealed to the blockchain at 466. At 467, a certification record transaction identifier ("CertRecord txn-ID") is returned to the certifier 420. At 468, the certification record transaction identifier ("CertRecord txn-ID") is delivered to the user 405.

FIG. 4C illustrates operations performed at the verifier 430. At 471, the user 405 presents to the verifier 430 the user generated data (UGD), the public key of the user, the seal transaction identifier (Seal txn-ID), and the certification record transaction identifier ("CertRecord txn-ID"). At 472, the verifier 430 then presents the seal transaction identifier (Seal txn-ID) and the certification record transaction identifier ("CertRecord txn-ID") to the blockchain 450 to retrieve the sealed records. At 473, the blockchain 450 delivers to the verifier 430 the seal record ("SealRecord") and the certification record ("CertRecord") stored to the blockchain.

At 474 the verifier extracts the signed hash of the user generated data. The verifier also hashes the user generated data by performing a hash algorithm on the UGD to create a generated hash value (<hash.UGD>). Also, the verifier 430 verifies that the generated hash value (<hash.UGD>) matches the hash value in the signature of the hashed UGD (<signed.hash.UGD>) from the seal record ("SealRecord") using in part the public key of the user. At 475, if the generated hash value is verified, then the verifier 430 may retrieve the sealed certification record using the certifier seal transaction identifier ("certifier Seal txn-ID"). At 476, the sealed certification record (Certifier Seal Record) is returned to the verifier 430 from the blockchain 450. At 477, the verifier 430 verifies that the information in the sealed certification record matches presented data. For example, the certification signature (CertSig) in the sealed certification record is verified against newly presented CertSig data. At 478, if the data is verified, then the verifier 430 verifies that the user generated data (UGD) is sealed and certified by the certifier 420.

Exchange of Data Securely Via a Secure Envelope Between Two Users Via a Server

It is possible to provide the secure exchange of data described in the prior section by using a server. This can be handy if it is not feasible to exchange large data sets between two users. For example, User A may be on a mobile device and user B may be also on a mobile device or even interact via a web page. The two users in this case cannot exchange data directly without having a communication path. One way, they can share data is through digital codes such as a bar-code, a QR code, pdf-417-code or any other similar type of displayable codes. This section describes how variable sizes of data blocks (potentially very large data blocks) can be securely exchanged between such two parties by utilizing a server in the middle. This description outlines a method where the server stores and directs the messages for the two parties, but is unable to ever read any of its content, in one embodiment. The server in the middle is depicted by the name "Store" 520 in this description, but it can be any server.

The assumption in this exchange is that the two users already know one another and are aware of each others' SealId, and ultimately each other public keys that are associated with corresponding private keys they have used to Seal their identification.

User A intends to send a block of data to user B. User A places that data in a data block and may add additional identification fields to that block of data such as timestamp, its own SealId, User B's SealId, its public key and if there is a session between the two, a sessionId. The value of the timestamp and the sessionId is to ensure vitality of the data block versus one that may have been created and somehow reused again. This data block will be referred to as <dataBlock>.

Next, User A uses its own private key to digitally sign the <dataBlock> that was created. The result is <envelopeSignature>. Next, an <envelopeContent> is created by putting together the <dataBlock> and the <envelopeSignature>. Last, a <secureEnvelope> is created by encrypting the <envelopeContent> with User B's public key.

Once a <secureEnvelope> is created by User A, the <secureEnvelope> is sent to Store. Store creates a unique <messageId> that is associated with the <secureEnvelope> and it returns that id to User A.

User A then relays the <messageId> and possibly the address of the Store server (if not a well known server service between the two Users) to User B. This data is rather short and can easily fit in nearly digital codes such as a bar code, a QR code, pdf-417-code and the like. User B receives the data in some form, such as scanning the code from the mobile screen of User A and then sends a message to Store to get the <secureEnvelope> associated with the <messageId>. Store returns the associated <secureEnvelope>. If the protocol requires that the transmission be a onetime process, the <secureEnvelope> can be deleted after a successful transmission. It is also possible to delete the envelope if an expiration time is associated with it.

This secure envelope can now be transmitted to user B from the store. User B can view the <envelopeContent> by decrypting the <secureEnvelope> using his private key that no one else is aware of. It may then verify the <dataBlock> in the envelope content by verifying the <dataBlock> and the <envelopeSignature> with the user A's public key that was passed. It may also verify that this is the same public key that was used in user A's SealId.

There is no restriction as to how User A passes the secure envelope to User B. It can be done via email, a text message, NFC, or any other form of digital communication where the data can be passed. Because it is encrypted using User B's public key, only User B can view the message and no other use can modify it either. In fact, after the secure envelope is created, even User A can no longer view its content, in one embodiment.

Figure 5:
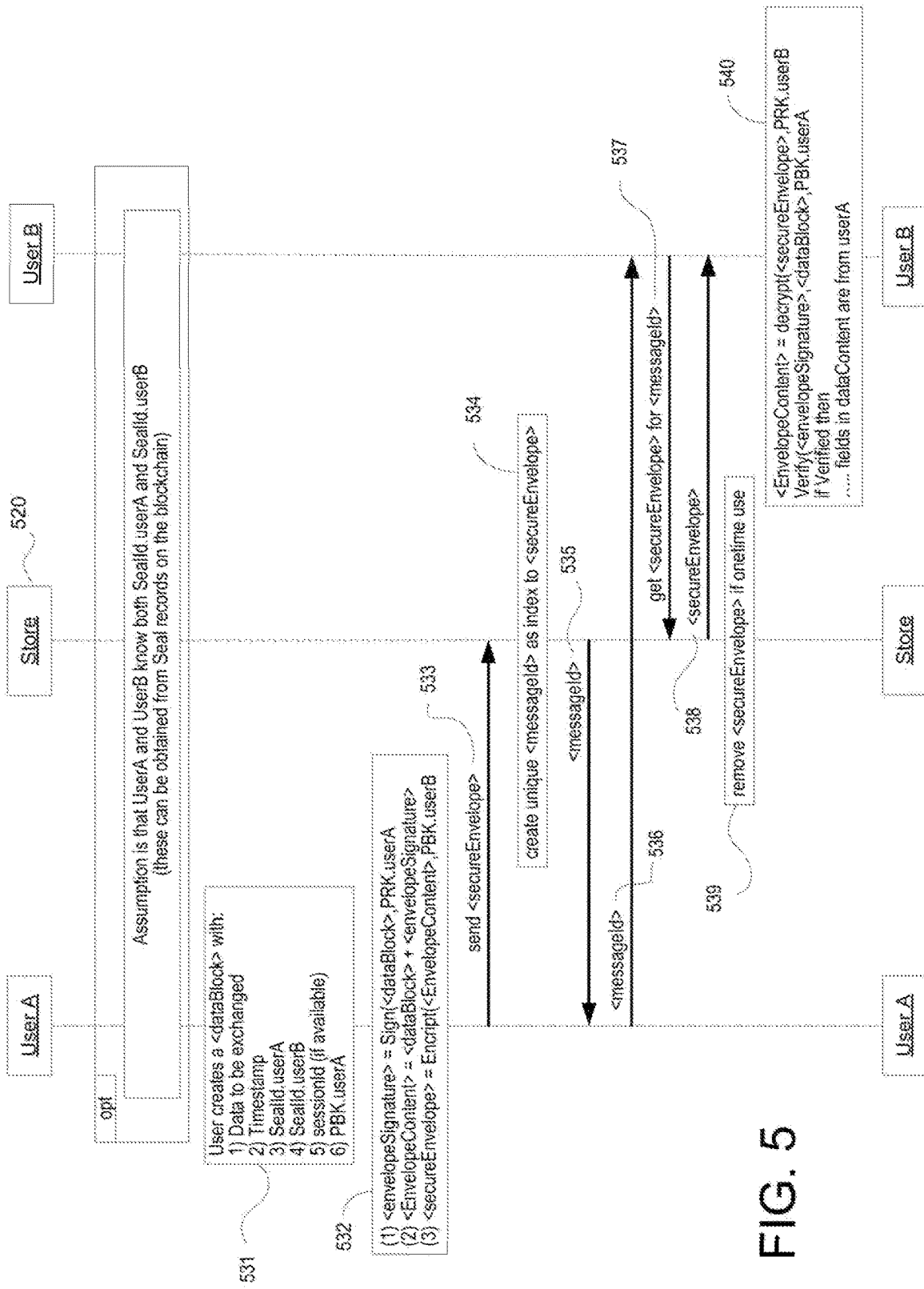
FIG. 5 is a data flow diagram illustrating secure data sharing via a server, in accordance with one embodiment of the present disclosure.

FIG. 5 in more detail shows the exchange of data securely via a Secure Envelope between two users via a server as described above, in accordance with one embodiment of the present disclosure. The secure envelope exchange disclosed in FIG. 5 includes participants: User A, User B, and Store 520. The assumption in this exchange is that the two Users A and B already know one another and are aware of each others' SealId (e.g., "SealID.userA" and "SealID.userB"), and may be obtained from seal records on a corresponding blockchain.

At 531, user A creates a data block <dataBlock> to include: the data to be exchanged, a timestamp, the seal identifier of user A (SealID.userA), the seal identifier of user B (SealID.userB), a session identifier (sessionID) if available, and the public key of user A.

At 532, user A signs the data block using the private key of user A to generate an envelope signature <envelopeSignature>. Also, an envelope <EnvelopeContent> is generated having contents including the data block and the envelope signature <envelopeSignature>. A secure envelope <secureEnvelope> may be generated by encrypting the contents of the envelope <EnvelopeContent> using the public key of user B.

At 533, user A sends the secure envelope <secureEnvelope> to store 520. At 534, store 520 may create a unique message identifier <messageID> to be used as an index for accessing the secure envelope <secureEnvelope>. At 535, the message identifier <messageID> is delivered from store 520 to user A.

At 536, the message identifier <messageID> is delivered from user A to user B. at 537, user B accesses the secure envelope <secureEnvelope> by sending message identifier <messageID> to store 520. At 538 the secure envelope <secureEnvelope> is delivered from store 520 to user B. At 539, the secure envelope <secureEnvelope> may be removed from store 520 if it generated for purposes of a one-time use.

At 540, user B extracts the contents of the secure envelope <secureEnvelope> by decrypting the secure envelope <secureEnvelope> using the private key of user B. The data block that is extracted is verified using the envelope signature <envelopeSignature> and the public key of user A.

It should be understood that the embodiments and described use cases herein are only by way of example. Many new use cases can be encompassed and facilitated by the functionality described herein. For instance, identity verification can be integrated into various commercial applications, as well as private applications. Commercial applications may include those that require commercial entities to verify a user's identity. Verifying a user's identity can be required for achieving any number of functions, such as traveling, making transactions, banking, communication, loan verification, credit verification, purchase verification, and other uses. Private identity verification can also be facilitated using the methods, apparatus, computer readable media, and systems described herein. Private identity verification may be useful when a user wishes to prove to another user their identity, in a fast and efficient manner. The systems described herein, as described above, utilize methods that write data to the block chain database, which is non-rewritable and permanently maintains the record without compromise. This enables writing of information to the block chain in a manner that can be verified by one or more transactions executed by methods of the present inventions.

Additionally, the method operations described herein may be executed with any number of computer systems. By way of example, the computer systems may include user devices, such as mobile phones, tablets, desktop computers, watch computers, head attached computers, eyeglasses computers, or combinations thereof. Server operations may also be performed and communicated between client devices, to facilitate transactions with the block chain database, server storage, and the like. By way of example, these computer devices can communicate over networks, such as the Internet. The networks enable individual devices to transact with each other, such as by way of sending, receiving, and processing exchanged information. The exchanged information can include different types of encrypted data, hashed data, envelopes, codes, QR codes, messages, notifications, and other types of data.

The messaging and communication functions are provided to enable users to exchange data in order to verify identity, or enable or provide access to users to services, goods, or commercial transactions. In the case of banking operations, the verification process can be utilized by banks, as well as users of the bank or third parties that require certified information from the banks regarding users. In the case of travel type verifications, different travel entities can require identification of users, and that the identification be verified by themselves or by other third parties that are trusted. These operations can be facilitated using the systems, methods, computer readable media, and code that execute the verification processes. Broadly speaking, verification of a user identity can be useful in any type of industry, or private setting. The use of verification is simply facilitated by using the verifying infrastructure, programs code, applications, and combinations thereof, to ensure that verification is secure.

In some embodiments, the verification systems can be embodied in an application, such as those that can be installed on mobile devices (e.g., Apps). By way of example, users wishing to have their identity verified can use an App to seal information regarding their identity. Once the data has been sealed, and encrypted data has been stored to the block chain, this data can be used for later certification by another party. The other party may also be utilizing a corresponding App, which enables efficient reading of the data, code, QR code, message, or notification, to validate the identity of the user.

In still other embodiments, code plug-ins can be integrated into commercial websites, which may use identity verification for different reasons or functions. For example, banks can install plug-in applications, code, or programs that can execute part or all of the verification processing to seal information and/or to certify information regarding identity. In view of the foregoing, it should be understood that the verifying processes described herein and the various use cases are only by way of example, and additional use cases will be evident to those skilled in the art.

In an example embodiment, a method is described. According to the method, logic on a remote device causes the capture of personal data identifying a user from an identification card. The remote device supports a user-accessible interface. The logic generates a hash value from the personal data using a hashing algorithm and signs the hash value with a digital signature created using a private key paired with a public key. Then the logic transmits, over a network, the signed hash value and the public key from the remote device to a distributed public database for storage. The logic then receives, over the network, a transaction number from the distributed public database and, transmits using the user-accessible interface, the transaction number and the personal data to a remote device of a third party for certification and/or verification.

In another example embodiment, another method is described. According to the method, logic on a first remote device causes the capture of personal data identifying a user from an identification card. The first remote device supports a user-accessible interface. The logic generates a hash value from the personal data using a hashing algorithm and signs the hash value with a digital signature created using a first private key paired with a first public key. Then the logic transmits, over a network, the signed hash value and the first public key from the remote device to a distributed public database for storage. The logic then receives, over the network, a first transaction number from the distributed public database.

The logic then transmits the first transaction number and the personal data to a second remote device, wherein logic on the second remote device (a) uses the first transaction number to retrieve the signed hash value and the first public key from the distributed public database, (b) hashes the personal data using the hashing algorithm to create a generated hash value, (c) verifies that the hash value in the signed hash value is the same as the generated hash value, (d) verifies that the signed hash value was signed with the first private key, and (e) creates a certification.

In another example embodiment, another method is described. According to the method, logic on a first smartphone causes the capture of personal data identifying a user from an identification card. The logic generates a hash value from the personal data using a hashing algorithm and signs the hash value with a digital signature created using a first private key paired with a first public key. Then the logic transmits, over a network, the signed hash value and the first public key from the remote device to a block chain database for storage. The logic then receives, over the network, a first transaction number from the block chain database.

The logic then transmits the first transaction number and the personal data to a second smartphone, wherein logic on the second smartphone (a) uses the first transaction number to retrieve the signed hash value and the first public key from the block chain database, (b) hashes the personal data using the hashing algorithm to create a generated hash value, (c) verifies that the hash value in the signed hash value is the same as the generated hash value, (d) verifies that the signed hash value was signed with the first private key, and (e) creates a certification.

Other aspects and advantages of the inventions will become apparent from the detailed description, taken in conjunction with the accompanying drawings, which illustrate by way of example the principles of the inventions.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Having provided this detailed description, it will be apparent that modifications and variations are possible without departing from the scope of the invention defined in the appended claims. When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained. As various changes could be made in the above systems without departing from the scope of the invention, it is intended that all matter contained in the above description and shown in the accompanying drawings shall be interpreted as illustrative and not in a limiting sense.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the web site might host an online retailer or an online publication, instead of a connected-television service. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. An apparatus, comprising:
   a memory; and
   a processor operatively coupled to a public storage facility and the memory, the processor configured to:
   receive, from a compute device, identity data associated with a user;
   hash the identity data using a hashing algorithm to obtain a first hash value;
   receive a first transaction identifier, the first transaction identifier associated with a second hash value in the public storage facility;
   obtain, using the first transaction identifier, the second hash value from the public storage facility;
   validate an identity of the user in response to verifying that the first hash value corresponds with the second hash value;
   define a certification record based on the validating;
   store the certification record in the public storage facility; and
   provide, to the compute device, a second transaction identifier, the second transaction identifier associated with the certification record in the public storage facility such that the compute device can provide the second transaction identifier to a verifier.

2. The apparatus of claim 1, wherein the processor is configured to receive the identity data from the compute device as encrypted identity data, the processor configured to decrypt the encrypted identity data using a private key associated with the processor to obtain the identity data prior to hashing the identity data.

3. The apparatus of claim 1, wherein the processor is configured to digitally sign the certification record using a private key associated with the processor prior to storing the certification record in the public storage facility.

4. The apparatus of claim 1, wherein the public storage facility is a blockchain.

5. The apparatus of claim 1, wherein the identity data is from at least one of a driver license, a passport, an employee badge, a military identification, a political identification, a student identification, a library card or a social club card.

6. The apparatus of claim 1, wherein the processor is configured to:
obtain, using the second transaction identifier, the certification record from the public storage facility; and
validate, based on the certification record, that the identity of the user has been certified.

7. A method, comprising:
receiving, from a compute device, identity data associated with a user;
hashing the identity data using a hashing algorithm to obtain a first hash value;
obtaining a second hash value from a public storage facility;
validating an identity of the user in response to verifying that (1) the first hash value corresponds with the second hash value and (2) the second hash value is signed with a private key associated with the compute device;
defining a certification record based on the validating; and
providing, to the compute device, a transaction identifier, the transaction identifier associated with the certification record in the public storage facility such that the compute device can provide the transaction identifier to a verifier.

8. The method of claim 7, wherein the transaction identifier is a first transaction identifier, the method further comprising:
receiving a second transaction identifier, the second transaction identifier associated with the second hash value in the public storage facility, the obtaining the second hash value including obtaining the second hash value using the second transaction identifier.

9. The method of claim 7, wherein the receiving includes receiving the identity data as encrypted identity data, the method further comprising:
decrypting the encrypted identity data to obtain the identity data.

10. The method of claim 7, wherein the public storage facility is a blockchain.

11. The method of claim 7, wherein the identity data is from at least one of a driver license, a passport, an employee badge, a military identification, a political identification, a student identification, a library card or a social club card.

12. The method of claim 7, further comprising:
digitally signing the certification record using a private key prior to storing the certification record in the public storage facility.

13. The method of claim 7, further comprising:
obtaining, using the transaction identifier, the certification record from the public storage facility; and
validating, based on the certification record, that the identity of the user has been certified.

14. A non-transitory processor-readable medium storing code representing instructions to be executed by a processor, the code comprising code to cause the processor to:
receive, from a compute device, encrypted identity data associated with a user;
decrypt the encrypted identity data using a private key associated with the processor to obtain identity data;
hash the identity data using a hashing algorithm to obtain a first hash value;
obtain a second hash value from a public storage facility;
validate an identity of the user in response to verifying that the first hash value corresponds with the second hash value;
define a certification record based on the validating; and
provide, to the compute device, a transaction identifier, the transaction identifier associated with the certification record in the public storage facility such that the compute device can provide the transaction identifier to a verifier.

15. The non-transitory processor-readable medium of claim 14, wherein the code to cause the processor to validate includes code to cause the processor to validate the identity of the user in response to (1) verifying that the first hash value corresponds with the second hash value and (2) verifying that the second hash value is signed with a private key associated with the compute device.

16. The non-transitory processor-readable medium of claim 14, wherein the public storage facility is a blockchain.

17. The non-transitory processor-readable medium of claim 14, wherein the identity data is from at least one of a driver license, a passport, an employee badge, a military identification, a political identification, a student identification, a library card or a social club card.

18. The non-transitory processor-readable medium of claim 14, further comprising code to cause the processor to:
digitally sign the certification record using a private key associated with the processor prior to storing the certification record in the public storage facility.

19. The non-transitory processor-readable medium of claim 14, wherein the encrypted identity data is encrypted using at least one of Rivest-Shamir-Adleman (RSA) encryption algorithm or Elliptic Curve Digital Signature Algorithm (ECDSA).

20. The non-transitory processor-readable medium of claim 14, wherein the transaction identifier is a first transaction identifier, the code further comprising code to cause the processor to:
receive a second transaction identifier, the second transaction identifier associated with the second hash value in the public storage facility, the code to cause the processor to obtain includes code to cause the processor to obtain the second hash value using the second transaction identifier.

* * * * *